United States Patent
Katsaros

(10) Patent No.: US 7,156,196 B2
(45) Date of Patent: Jan. 2, 2007

(54) HUB MOTOR FORMED IN A WHEEL

(76) Inventor: Stephen Basil Katsaros, 2610 Dexter St., Denver, CO (US) 80207

( * ) Notice: Subject to any disclaimer, the term of this patent is extended or adjusted under 35 U.S.C. 154(b) by 0 days.

(21) Appl. No.: 11/291,697

(22) Filed: Dec. 1, 2005

(65) Prior Publication Data

US 2006/0102404 A1    May 18, 2006

Related U.S. Application Data

(63) Continuation of application No. 10/514,264, filed on Nov. 12, 2004, now Pat. No. 6,971,467.

(51) Int. Cl.
*B62K 11/00* (2006.01)

(52) U.S. Cl. ............... 180/205; 180/65.5; 180/207; 180/219; 180/2.2; 180/65.1

(58) Field of Classification Search ............... 280/212; 180/65.5, 219, 205, 207, 2.2, 65.1; 301/6.5; 310/67 R, 92

See application file for complete search history.

(56) References Cited

U.S. PATENT DOCUMENTS

| | | | |
|---|---|---|---|
| 552,312 A | 12/1895 | Battey | |
| 564,155 A | 7/1896 | Millet | |
| 686,284 A | 11/1901 | Gottschalk | |
| 710,329 A | 9/1902 | Marks | |
| 729,197 A | 5/1903 | Mathieu | |
| 731,207 A | 6/1903 | Nechlediel et al. | |
| 752,741 A | 2/1904 | Wilkinson | |
| 904,721 A | 11/1908 | Perillard | |
| 1,247,752 A | 11/1917 | Van Antwerp | |
| 1,257,711 A | 2/1918 | Johnson | |
| 1,308,602 A | 7/1919 | Mennesson | |
| 1,330,896 A | 2/1920 | Neldner | |
| 1,394,516 A | 10/1921 | Burlat et al. | |
| 1,503,935 A | 8/1924 | Baker | |
| 2,331,976 A | 10/1943 | Hare | |
| 2,350,791 A | 6/1944 | Mennesson | |
| 2,574,824 A | 11/1951 | Garelli | |
| 2,575,873 A | 11/1951 | Henney | |
| 2,588,889 A | 3/1952 | Sherwood | |
| 2,756,832 A | 7/1956 | Dalrymple | |
| 3,878,910 A | 4/1975 | Walker | |
| 3,912,039 A | 10/1975 | Ordemann | |
| 3,921,745 A | 11/1975 | McCulloch et al. | |
| 3,939,932 A | 2/1976 | Rosen | |
| 3,966,007 A | 6/1976 | Havener et al. | |
| 4,132,281 A | 1/1979 | Gaddi | |
| 4,200,164 A | 4/1980 | Pearne | |
| 4,267,898 A | 5/1981 | Wheaton | |
| 4,301,885 A | 11/1981 | Kostron | |
| 4,397,369 A | 8/1983 | Read | |
| 4,516,647 A * | 5/1985 | Novak ............... | 180/2.2 |
| 4,721,177 A | 1/1988 | Qizhen | |
| 5,600,191 A * | 2/1997 | Yang ............... | 310/67 R |
| 5,765,658 A | 6/1998 | Mayer | |
| 6,024,186 A | 2/2000 | Suga | |
| 6,347,682 B1 | 2/2002 | Buchner | |
| 6,557,657 B1 | 5/2003 | Persson | |

(Continued)

FOREIGN PATENT DOCUMENTS

DE          85925          9/1921

(Continued)

*Primary Examiner*—J. Allen Shriver
*Assistant Examiner*—Cynthia F. Collado

(57) ABSTRACT

Disclosed herein is a hub motor (100) formed in a wheel (14) for assisting in the movement of a vehicle (10) and methods associated therewith.

4 Claims, 21 Drawing Sheets

U.S. PATENT DOCUMENTS 6,571,889 B1    6/2003  Simons
6,971,467 B1 *  12/2005 Katsaros ................. 180/205

FOREIGN PATENT DOCUMENTS

| | | |
|---|---|---|
| DE | 347111 | 1/1922 |
| DK | 22272 | 1/1916 |
| FR | 440612 | 6/1912 |
| GB | 18251 | 9/1901 |
| GB | 22499 | 10/1904 |
| GB | 16573 | 7/1913 |
| GB | 103174 | 1/1917 |
| GB | 129303 | 7/1919 |
| IT | 371771 | 3/1939 |

* cited by examiner

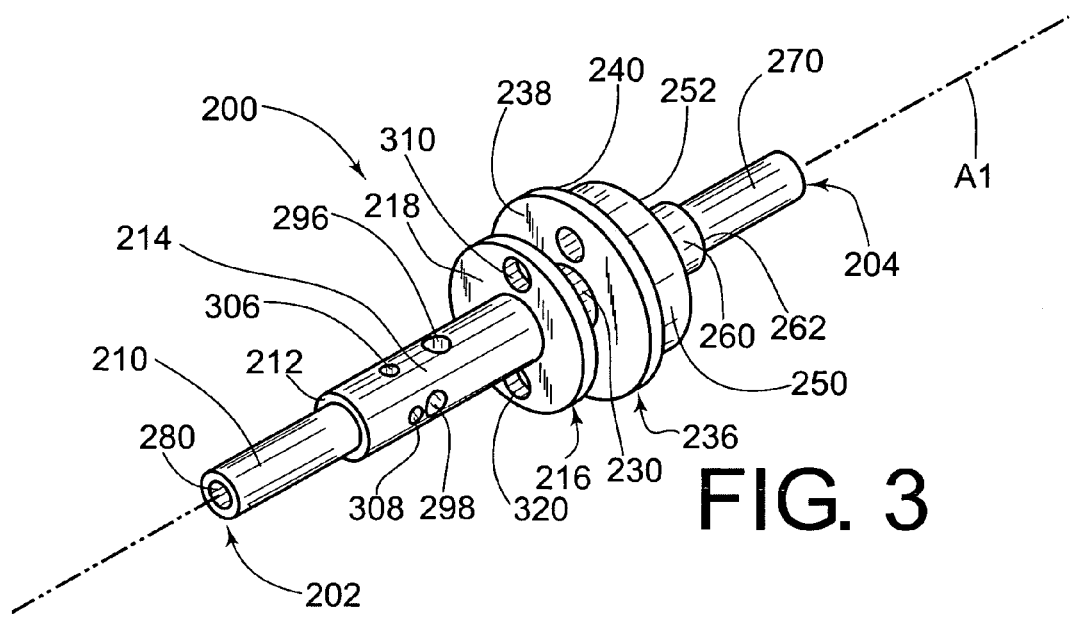
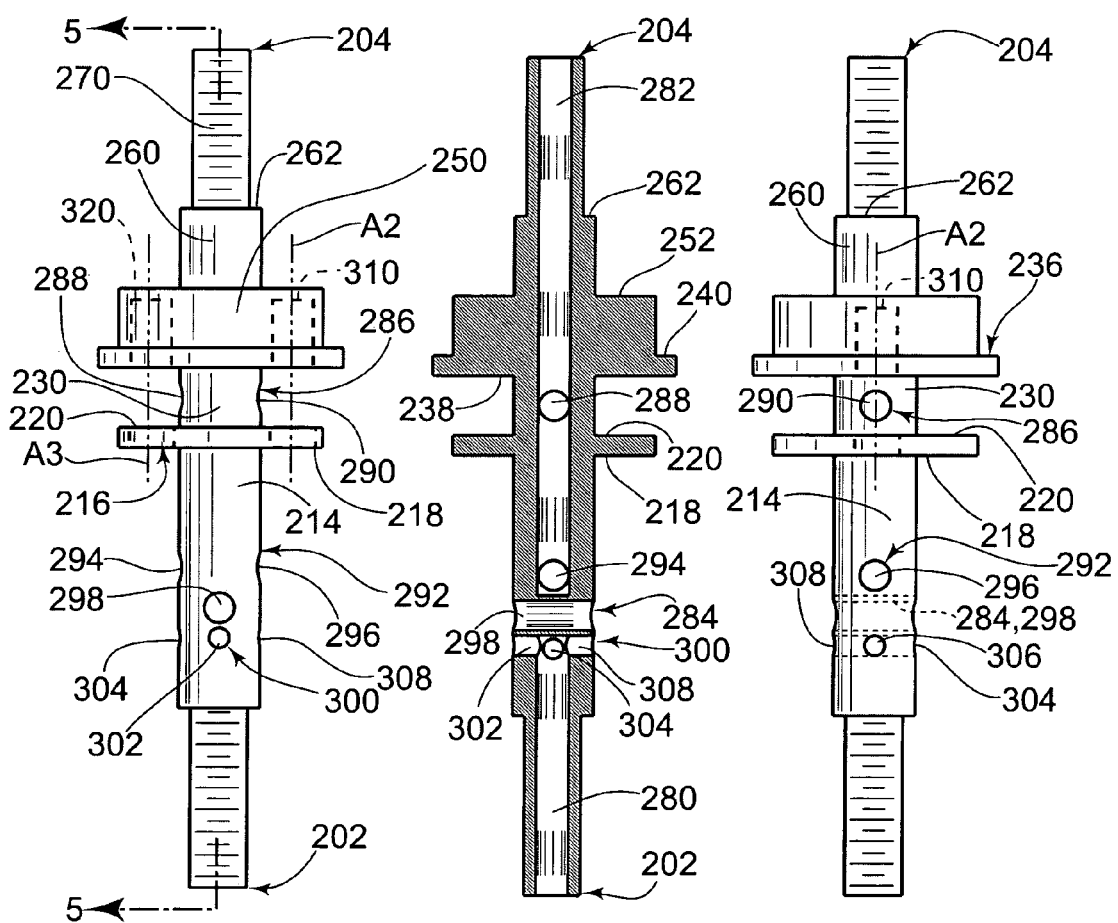

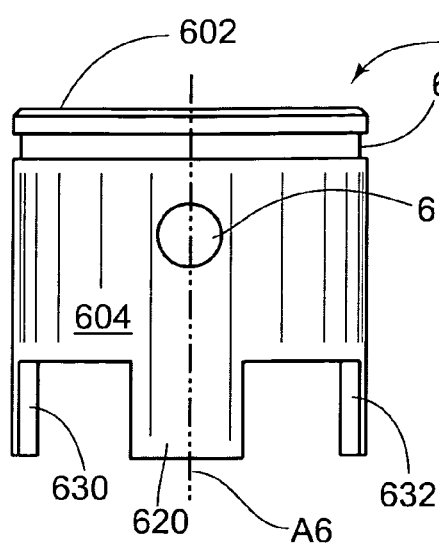
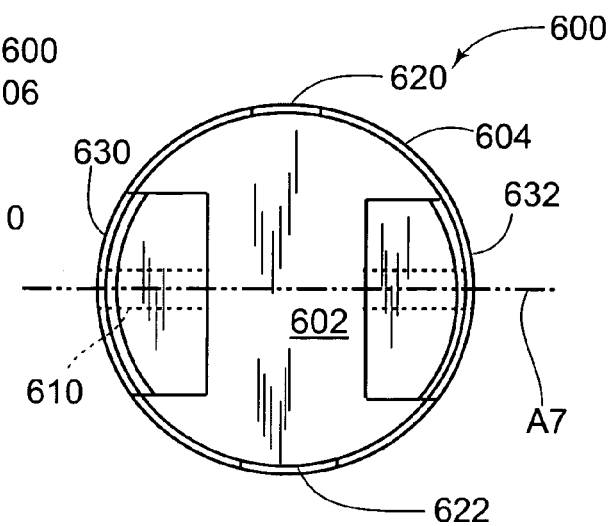
FIG. 13    FIG. 14
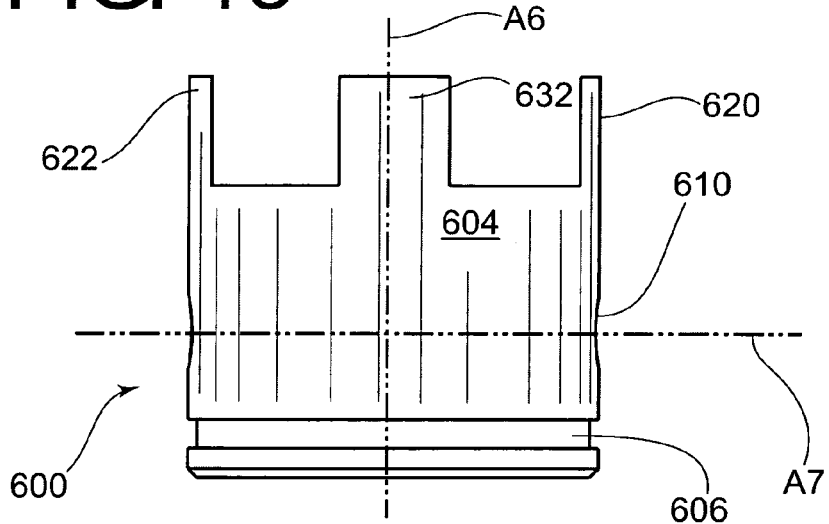
FIG. 15
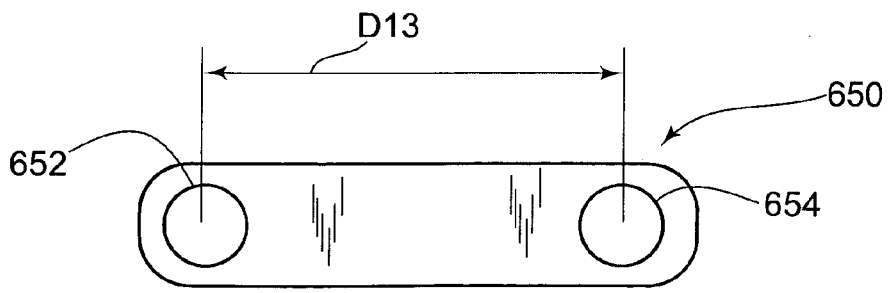
FIG. 16

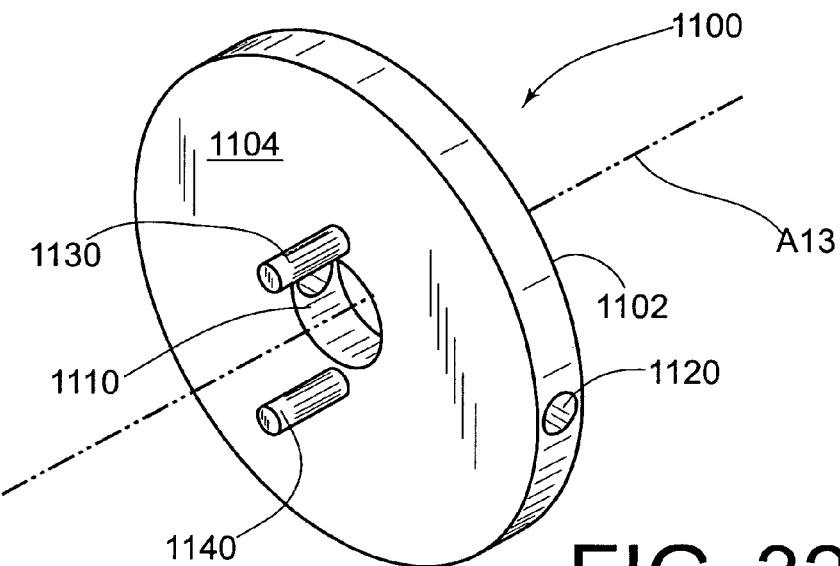
FIG. 32
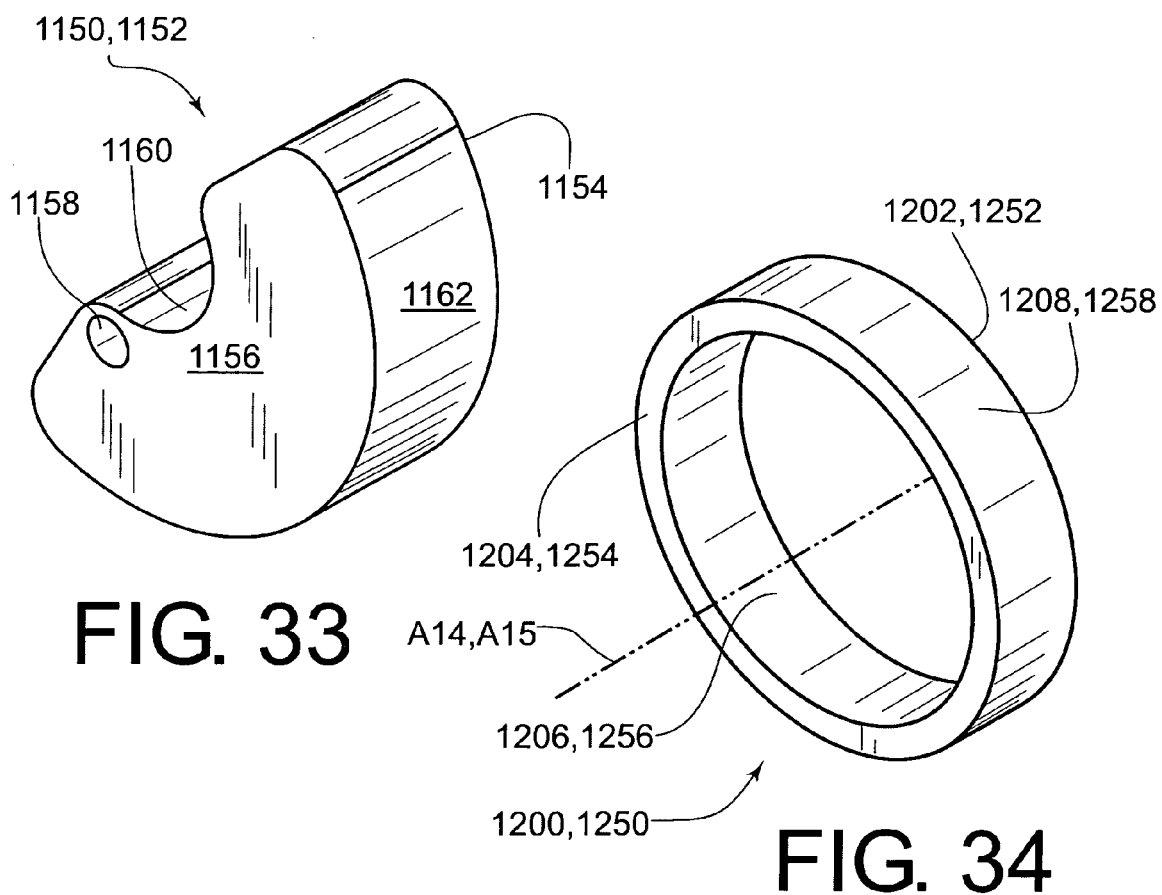
FIG. 33
FIG. 34

HUB MOTOR FORMED IN A WHEEL

This application is a continuation of prior application Ser. No. 10/514,624 with a PCT Filing Date of May 15, 2003. Prior application Ser. No. 10/514,624 is scheduled for issuance on Dec. 6, 2005 as U.S. Pat. No. 6,971,467. U.S. Pat. No. 6,971,467 is specifically incorporated by reference for all that is contained therein.

BACKGROUND

Transportation devices have contained motors in the past. Certain limitations of these prior art motors have been realized. One of these limitations is that engines operate at a relatively high speed (e.g. 5,000 to 10,000 revolutions per minute) while wheels on vehicles operate at much lower speeds (e.g. a 26-inch bicycle wheel may operate at 100 revolutions per minute).

SUMMARY

In one exemplary embodiment disclosed herein, a wheel for a transportation device may include: an engine formed in the wheel; and a carburetor fixedly attached to the transportation device, the carburetor being fluid communication with the engine.

In another exemplary embodiment disclosed herein, a wheel defining a first axis for a transportation device may include: an engine formed in the wheel, the engine comprising a crankshaft; a first gear having a first surface, the first surface being gearingly coupled to the drive shaft, the first gear being concentric to the first axis; a second gear integrally formed on the first gear first surface; and wherein the second gear is drivably engaged with the transportation device.

In another exemplary embodiment disclosed herein, a method of moving a transportation device may include: providing an engine formed in a wheel, the engine comprising a piston; providing a carburetor fixedly attached to the transportation device; mixing a combustible liquid with air in the carburetor to form a combustible mixture; transferring the combustible mixture to the engine; exploding the combustible mixture in the engine to move the piston; and transferring the piston movement to the transportation device.

In another exemplary embodiment disclosed herein, a wheel for a transportation device may include: a hub comprising an external cylindrical face; and an internal combustion engine formed on the external cylindrical face.

In another exemplary embodiment disclosed herein, a wheel for a vehicle may include: a mixing means for creating a combustible mixture, the mixing means fixedly attached to the vehicle; and a combusting means for igniting the combustible mixture, the combusting means rotationally attached to the vehicle.

BRIEF DESCRIPTION OF THE DRAWING

Illustrative embodiments are shown in Figures of the Drawing in which:

FIG. 3 shows a perspective view of an exemplary axle assembly.

FIG. 4 shows a front elevation view the axle assembly of FIG. 3.

FIG. 5 shows a cross-sectional view taken across plan 5—5 of FIG. 4 of the axle assembly of FIG. 3.

FIG. 6 shows a side elevation view the axle assembly of FIG. 3.

FIG. 13 shows a side elevation view of a piston.

FIG. 14 shows a bottom plan view of the piston of FIG. 13.

FIG. 15 shows a front elevation view of the piston of FIG. 13.

FIG. 16 shows a side elevation view of a crank arm.

FIG. 32 shows a perspective view of an overdrive cover.

FIG. 33 shows a perspective view of a pad.

FIG. 34 shows a perspective view of an overdrive disk and a starter disk.

DETAILED DESCRIPTION

Provided herein is a detailed description for a hub motor 100 contained within a wheel (e.g. a front wheel 14). The hub motor 100 may be utilized for any one of a variety of devices such as utility carts, tricycles, bicycles, recumbent vehicles, mini transportation vehicles, wheelbarrows, wheelchairs, pedicabs and other devices capable of moving from one location to another location. It should be noted that the description provided herein is directed to a bicycle 10, it being understood that the hub motor 100 may be utilized in any one of the previously mentioned devices or equivalents thereof.

Figure 1:
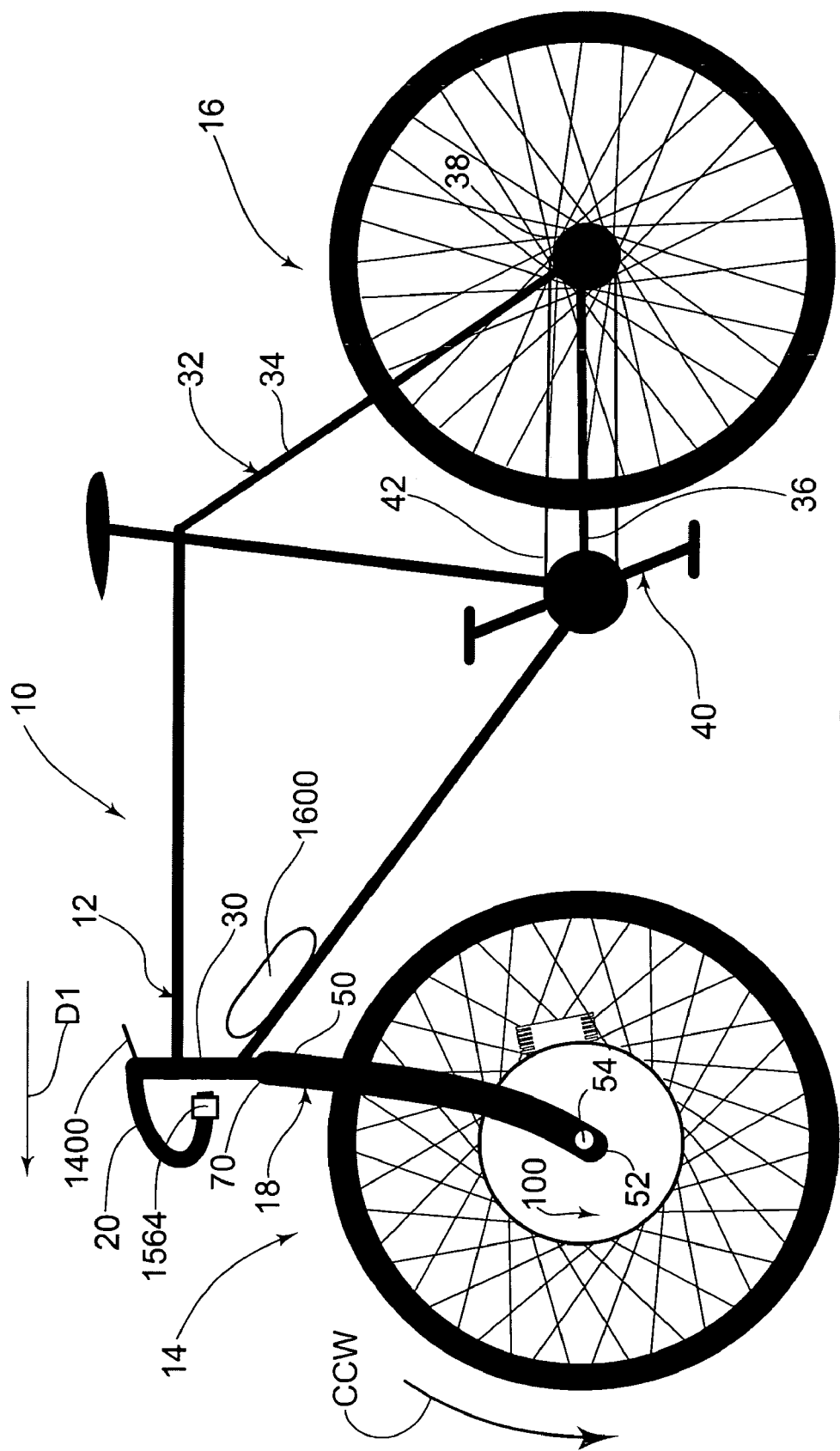
FIG. 1 shows a schematic diagram of an exemplary vehicle (e.g. a bicycle) provided with a wheel including a hub motor.

FIG. 1 shows a bicycle 10 provided with a frame 12, the front wheel 14, a rear wheel 16, a pair of forks 18 and a pair of handlebars 20. The frame 12 is provided with a headset 30 that may take the form of a hollow tube. The frame 12 is also provided with a rear triangle 32 which may include an upper member 34 and a lower member 36. The rear triangle upper and lower members 34, 36 form an intersection 38. The rear wheel 16 is rotationally mounted to the frame 12 at the rear triangle intersection 38. The bicycle 10 is conventionally provided with a pair of cranks 40 that are pivotally mounted to the frame 12. A chain 42 may rotationally couple the rear wheel 16 to the cranks 40.

The pair of forks 18 may be provided with a first fork 50 and a second fork 60. The pair of forks 18 may be further provided with a crown 70 to which the first fork 50 and the second fork 60 may be fixedly attached. The crown 70 may be pivotally attached to the headset 30, thereby pivotally attaching the pair of forks 18 to the frame 12. The pair of handlebars 20 may be fixedly attached to the crown 70; rotation of the handlebars 20 may be mirrored by the forks 18. The first fork 50 may be provided with a distal end 52. The first fork distal end 52 may be provided with a mounting plate 54. The second fork 60 may be provided with a distal end 62. The second fork distal end 62 may be provided with a mounting plate 64.

With reference to FIG. 1, the front wheel 14 may be rotationally mounted to the forks 18 at the first fork mounting plate 54 and the second fork mounting plate 64. Movement of the bicycle 10 in a first direction D1 causes counterclockwise rotation CCW of the front and rear wheels 14, 16. Likewise, rotation of the cranks 40 in a counterclockwise rotation CCW may cause the bicycle to move in the first direction D1. It is noted that the terms such as 'front', 'back', 'upper', 'lower', 'clockwise', 'counterclockwise', 'right', 'left', etc. are provided for illustrative purposes only and that these terms are relative to the orientation of the bicycle 10 or drawings thereof. Therefore, other orientations may be utilized while retaining the functionality of the device.

Either the front or rear wheel 14, 16 may be provided with a hub motor 100. It is noted that although the hub motor 100 is described herein and shown in the figures as component of the front wheel 14, the hub motor 100 may be incorporated in the rear wheel 16 or other wheels provided with a vehicle.

Figure 2:
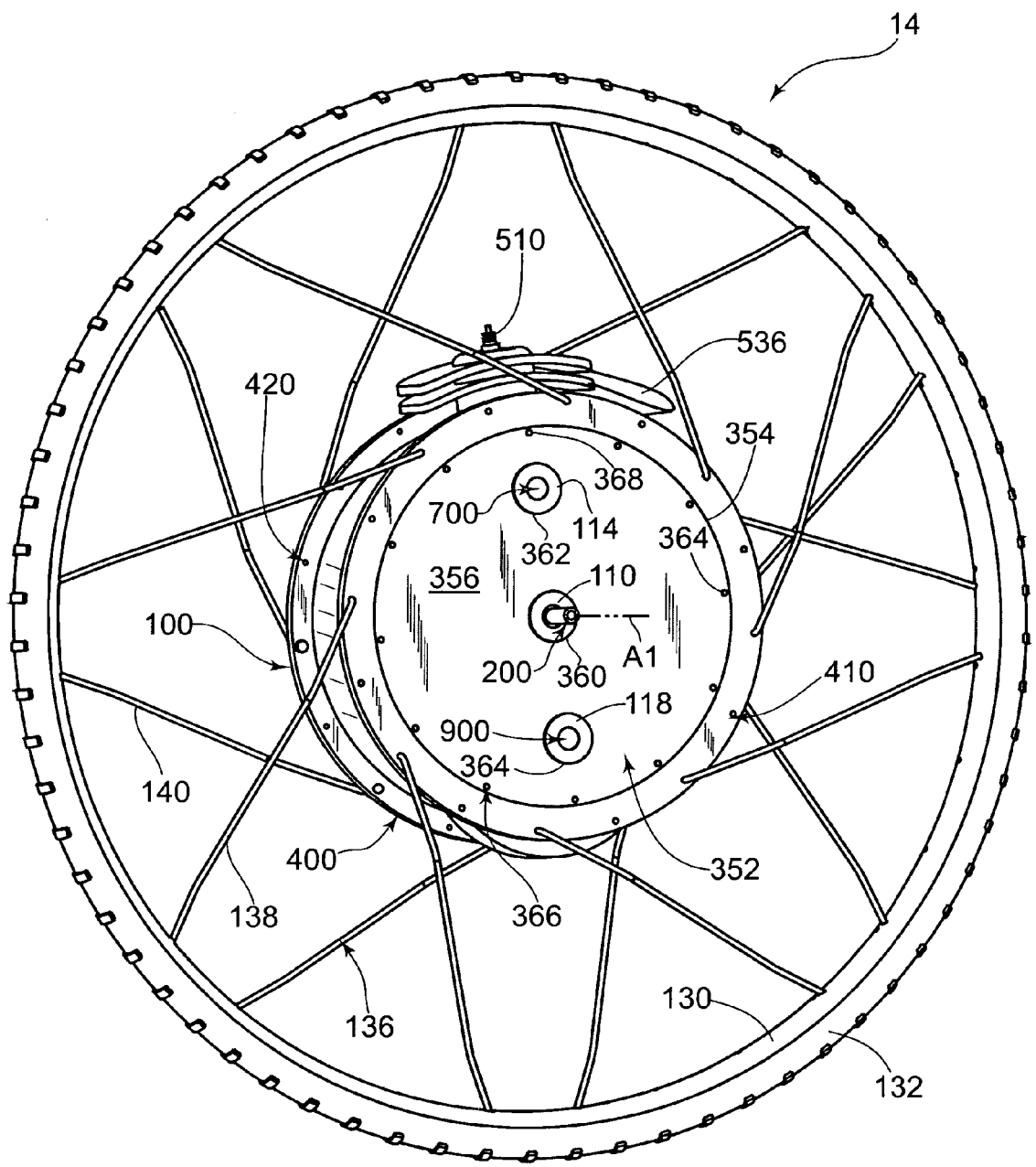
FIG. 2 shows perspective view of a hub motor.

With reference to FIG. 2, the hub motor 100 is substantially located at the center of the wheel 14. The hub motor 100 may define a first axis A1 about which the hub motor 100 and the entire wheel 14 rotates. The hub motor 100 may be provided with an axle assembly 200 about which the hub motor 100 rotates.

With reference to FIGS. 3–6, the axle assembly 200 may take a generally cylindrical form having a variety of features incorporated therewith. The axle assembly 200 is provided with a first end 202 and an oppositely disposed second end 204. The first end 202 may be provided with threads 210 formed therein. The axle assembly first end 202 may be provided with a first shoulder 212 at a point of termination of the threads 210. The axle assembly 200 may be further provided with a first surface 214 located between the first shoulder 212 and a first protrusion 216. The first surface 214 may be formed substantially cylindrical and may be concentric with the first axis Ga1. The first protrusion 216 may extend radially away from the first axis A1. The first protrusion 216 may have a first face 218 and an oppositely disposed second face 220, both of which may extend perpendicular from the first axis A1. The first face 218 may be facing the first distal end 202, while the second face 220 may be facing the second distal end 204. The axle assembly 200 may be further provided with a second surface 230. The second surface 230 may originate at the first protrusion second face 220 and terminate at a second protrusion 236. The second protrusion 236 may extend radially away from the first axis A1. The second protrusion 236 may have a first face 238 and an oppositely disposed second face 240, both of which may extend perpendicular from the first axis A1. The first face 238 may be facing the first distal end 202, while the second face 240 may be facing the second distal end 204. The axle assembly 200 may be further provided with a third surface 250. The third surface 250 may originate at the second protrusion second face 240 and terminate at a second shoulder 252. The third surface 250 may be formed substantially cylindrical and may be concentric with the first axis A1. The second shoulder 252 may extend perpendicular from the first axis A1 and may be facing the second distal end 204. The axle assembly 200 may be further provided with a fourth surface 260. The fourth surface 260 may originate at the second shoulder 252 and terminate at a third shoulder 262. The fourth surface 260 may be formed substantially cylindrical and may be concentric with the first axis A1. The third shoulder 262 may extend perpendicular from the first axis A1 and may be facing the second distal end 204. The axle assembly second distal end 204 may be provided with threads 270 formed therein. The threads 270 may originate at the third shoulder 262 and terminate at the end of the axle assembly 200.

With reference to FIG. 5, an exemplary embodiment of the axle assembly 200 is shown in a cross-sectional view taken across plan 5—5 (FIG. 4). The axle assebly 200 may be provided with a first cavity 280 and a second cavity 282. The cavities 280, 282 may take the form of blind-holes formed in the axle assembly 200. The first cavity 280 may originate at the first distal end 202 and extend to a cavity plug 284. It should be noted that the cavity plug 284 may be an integral component of the axle assembly 200 or alternatively, an independent component provided with the axle assembly 200. The second cavity 282 may originate at the second distal end 204 and extend to the cavity plug 284.

With reference to FIG. 6, the axle assembly 200 may be further provided with a pair of starter holes 286. The pair of starter holes 286 may include a first starter hole 288 (FIG. 4) and a second starter hole 290. The starter holes 286 may be formed in the second surface 230, thereby allowing for mechanical communication between the second surface 230 and the second cavity 282. The axle assembly 200 may be further provided with a pair of gearing holes 292. The pair of gearing holes 292 may include a first gearing hole 294 (FIG. 4) and a second gearing hole 296. The gearing holes 292 may be formed in the first surface 214, thereby allowing for mechanical communication between the first surface 214 and the second cavity 282. The axle assembly 200 may be further provided with an overdrive cover hole 298. The overdrive cover hole 298 may be formed in the axle assembly 200 and may be formed in the cavity plug 284. The axle assembly 200 may be further provided with a plurality of fuel holes 300, such as fuel holes 302, 304, 306, 308. The fuel holes 300 may be formed in the axle assembly 200 such that fluid communication may exist between the first surface 214 and the first cavity 280.

With reference to FIG. 4, the axle assembly 200 may be further provided with a first starter mount 310 and a second starter mount 320. The first starter mount 310 may take the form of a cylindrical hole defining a second axis A2, the second axis A2 may be parallel to the first axis A1. The second starter mount 320 may take the form of a cylindrical hole defining a third axis A3, the third axis A3 may be parallel to the first axis A1 and the second axis A2. The starter mounts 310, 320 may be formed through the first protrusion 216 and the second protrusion 236. Furthermore, the starter mounts 310, 320 may be formed into, but not completely through the portion defined by the third surface 250.

Figure 7:
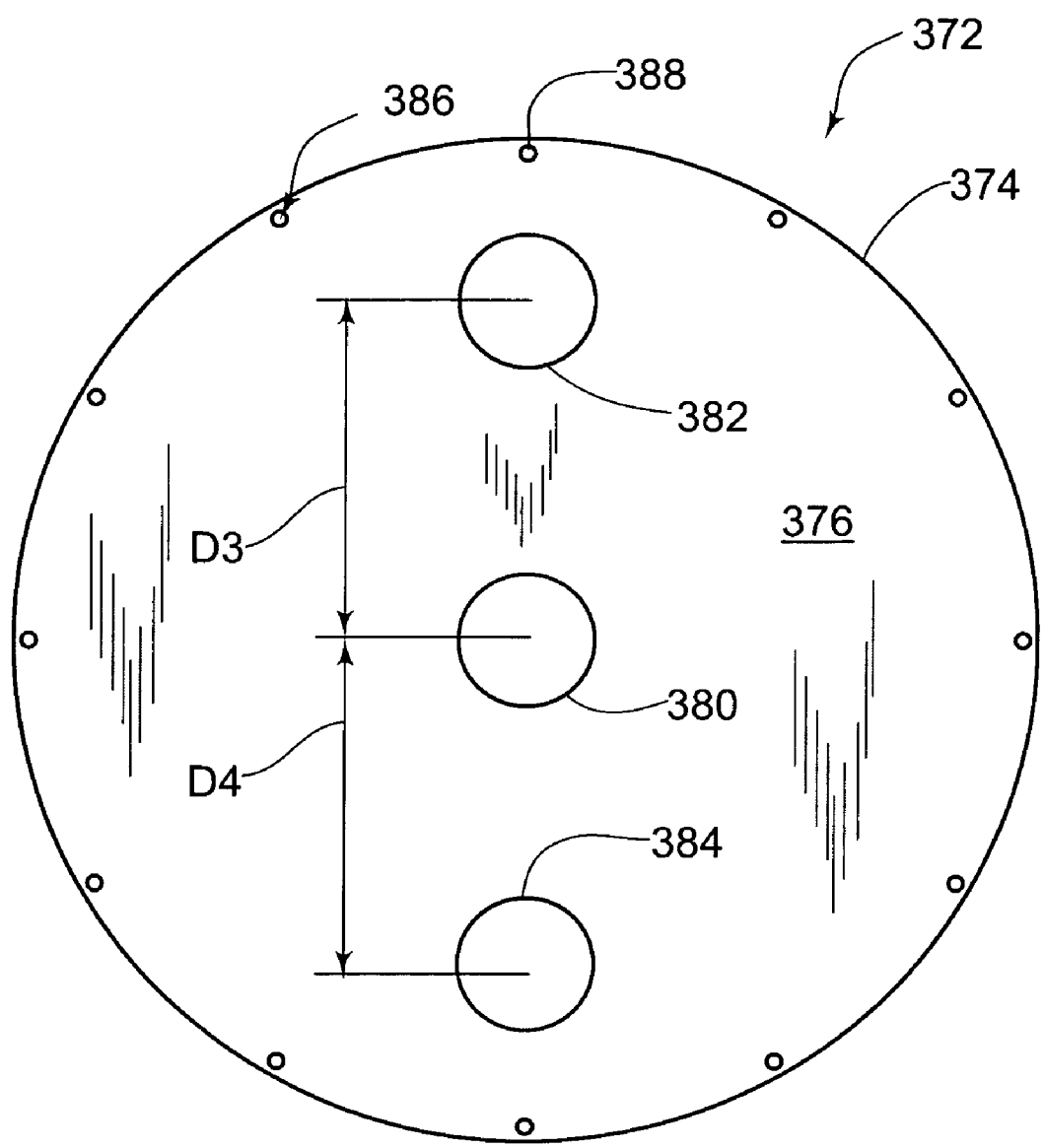
FIG. 7 shows a front elevation view a cover.

With reference to FIG. 2, the hub motor 100 may be provided with a pair of covers 350. The pair of covers 350 may include a first cover 352 and a second cover 372 (FIG. 7). The first cover 350 may take the form of a disk having a generally circumferential edge 354. The first cover 352 may be provided with a first face 356 and an oppositely disposed second face 358. The circumferential edge 354, the first face 356 and the second face 358 may define the disk-like configuration of the first cover 352. Bearing mounts may be formed in the first cover 352, such as a first bearing mount 360. The first bearing mount 360 may be located at the center of the first cover 352. The first cover 352 may be provided with as second bearing mount 362 and a third bearing mount 364. The second bearing mount 362 may be formed at a first distance D1 (FIG. 35) from the first bearing mount 360. In one exemplary embodiment, the first distance D1 may be about 2.88 inches. The third bearing mount 364 may be formed at a second distance D2 (FIG. 35) from the first bearing mount 360. In one exemplary embodiment, the second distance D2 may be about 2.75 inches. Furthermore, the bearing mounts 360, 362, 364 may take the form of holes through the first cover 352 thereby extending from the first face 356 to the second face 358. The first cover 352 may be further provided with a plurality of attachment holes 366 such as a first attachment hole 368. The first attachment hole 368 may be formed in-line with the bearing mounts 360, 362, 364.

Figure 38:
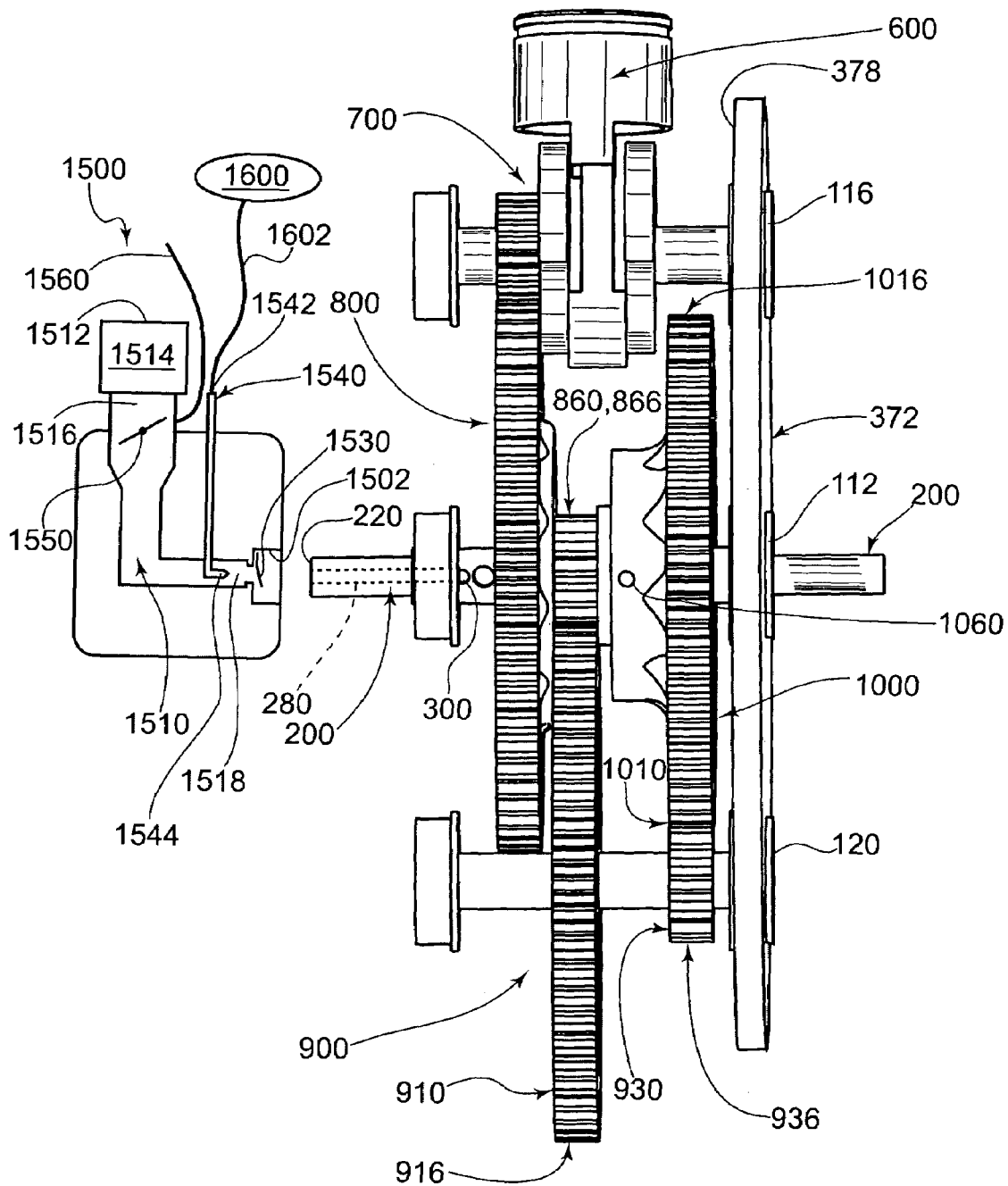
FIG. 38 shows a side view of the assembly of FIG. 37 provided with an exemplary carburetor.

With reference to FIG. 7, the second cover 372 may take the form of a disk having a generally circumferential edge 374. The second cover 372 may be provided with a first face 376 and an oppositely disposed second face 378 (FIG. 38). The circumferential edge 374, the first face 376 and the second face 378 may define the disk-like configuration of the second cover 372. Bearing mounts may be formed in the second cover 372, such as a fourth bearing mount 380. The fourth bearing mount 380 may be located at the center of the second cover 372. The second cover 372 may be provided with as fifth bearing mount 382 and a sixth bearing mount 384. The fifth bearing mount 382 may be formed at a third distance D3 from the fourth bearing mount 380. In one exemplary embodiment, the third distance D3 may be about 2.88 inches. The sixth bearing mount 384 may be formed at a fourth distance D4 from the fourth bearing mount 380. In one exemplary embodiment, the fourth distance D4 may be about 2.75 inches. Furthermore, the bearing mounts 380, 382, 384 may take the form of holes through the second cover 372 thereby extending from the first face 376 to the second face 378. The second cover 372 may be further provided with a plurality of attachment holes 386 such as a first attachment hole 388. The first attachment hole 382 may be formed in-line with the bearing mounts 380, 382, 384.

Figure 8:
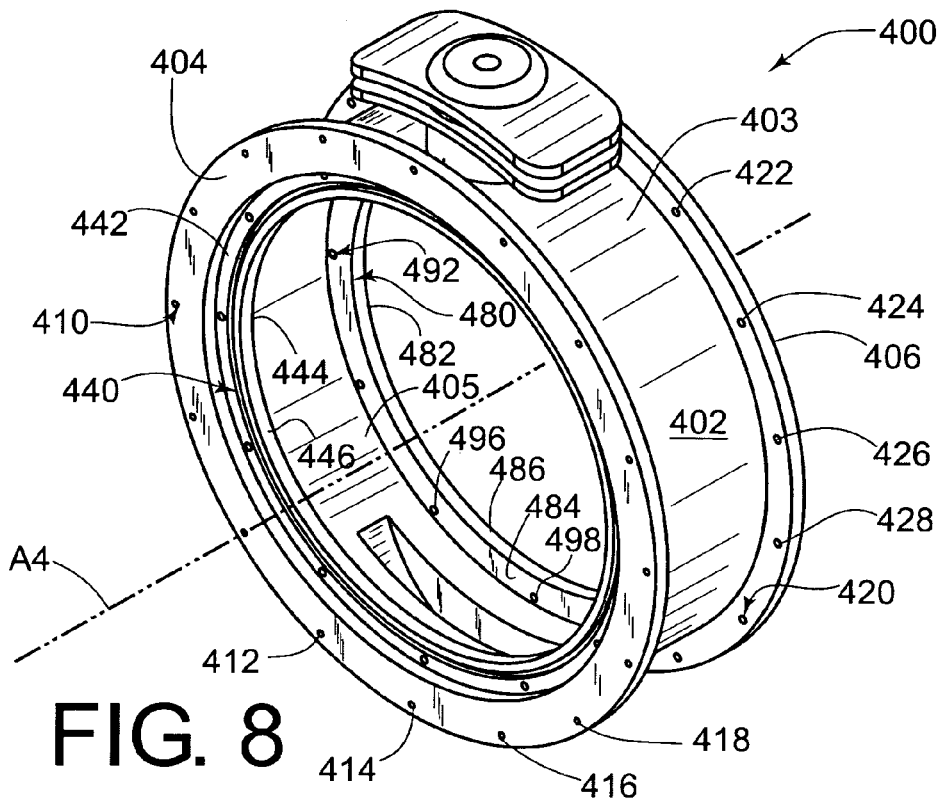
FIG. 8 shows a perspective view of a hub.

With reference to FIGS. 8–12, the hub motor 100 may be provided with a hub 400. The hub 400 may define a fourth axis A4. The hub 400 may be provided with a generally cylindrical member 402 that may be located concentric to the forth axis A4. The cylindrical member 402 may include an external cylindrical face 403 and an oppositely disposed internal cylindrical face 405. With reference to FIG. 8, the hub 400 may be provided with a first face 404 and an oppositely disposed second face 406. The cylindrical member 402 may be generally formed between the first face 404 and the second face 406. The hub first face 404 may be provided with a plurality of spoke holes 410, such as spoke holes 412, 414, 416, 418. The spoke holes 410 may be formed equidistant from the fourth axis A4 and equally spaced between each other. The hub second face 406 may be provided with a plurality of spoke holes 420, such as spoke holes 422, 424, 426, 428. The spoke holes 420 may be formed equidistant from the fourth axis A4 and equally spaced from each other.

With continued reference to FIG. 8, the hub 400 may be further provided with a first flange 440 and an oppositely disposed second flange 480.

Figure 9:
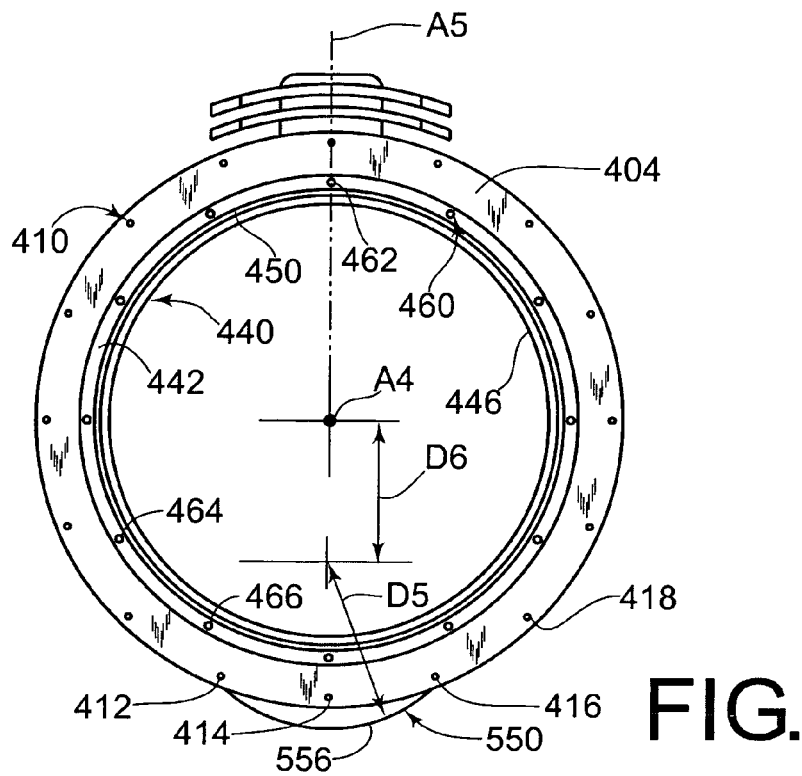
FIG. 9 shows a front elevation view of the hub of FIG. 8.

With reference to FIG. 9, the first flange 440 may be formed as a protrusion on the inside surface of the cylindrical member 402. The first flange 440 may be provided with a first face 442, an oppositely disposed second face 444 (FIG. 8) and an edge 446. The first flange 440 may be provided with a groove 450 formed in the first face 442. The first flange 440 may be provided with a plurality of threaded holes 460, such as threaded holes 462, 464, 466. The threaded holes 460 may be formed equidistant from the fourth axis A4 and equally spaced from each other.

With reference to FIG. 8, the second flange 480 may be formed as a protrusion on the inside surface of the cylindrical member 402. The second flange 480 may be provided with a first face 482, an oppositely disposed second face 484 and an edge 486. The second flange 480 may be provided with a groove 490 (FIG. 12) formed in the first face 482. The second flange 480 may be provided with a plurality of threaded holes 492, such as threaded holes 494 (FIG. 12), 496, 498. The threaded holes 492 may be formed equidistant from the fourth axis A4 and equally spaced from each other.

Figure 10:
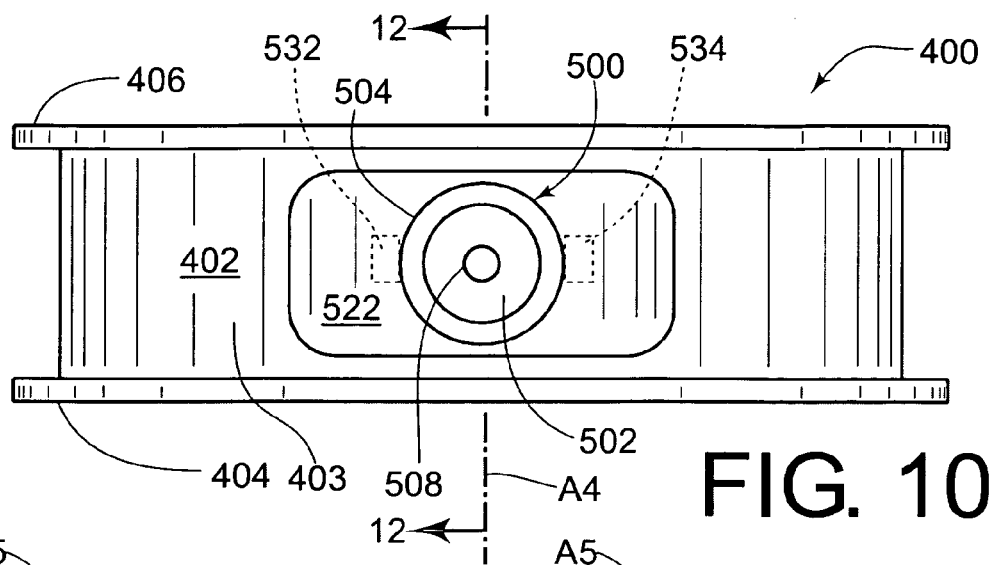
FIG. 10 shows a top plan view of the hub of FIG. 8.

With reference to FIG. 10, the hub 400 may be provided with an engine 500. Although the engine 500 is shown and described herein as a two-stroke engine, it is to be understood that other types of engines may be employed. Other types of engines include, but are not limited to, diesel engines, rotary engines and four-stroke engines. In the event that the four-stroke engine is utilized, at least two valves may be actuated to control the flow of combustible gases and exhaust gases. The engine 500 may be formed on the outside surface of the cylindrical member 402. The engine 500 may be formed directly on the cylindrical member 402, or alternatively may be removably attached thereto. The engine 500 may be located on the external cylindrical face 403; such placement may allow the engine 500 to be exposed to air (flowing there past) to cool the engine 500. The engine 500 may have a combustion chamber 530 (FIG. 12) taking the form of a cylinder 504 having one end thereof closed. The closed end of the engine 500 may be referred to herein as the head 502. The engine head 502 may be provided with a threaded hole 508 capable of receiving a sparkplug 510 (FIG. 2).

Figure 11:
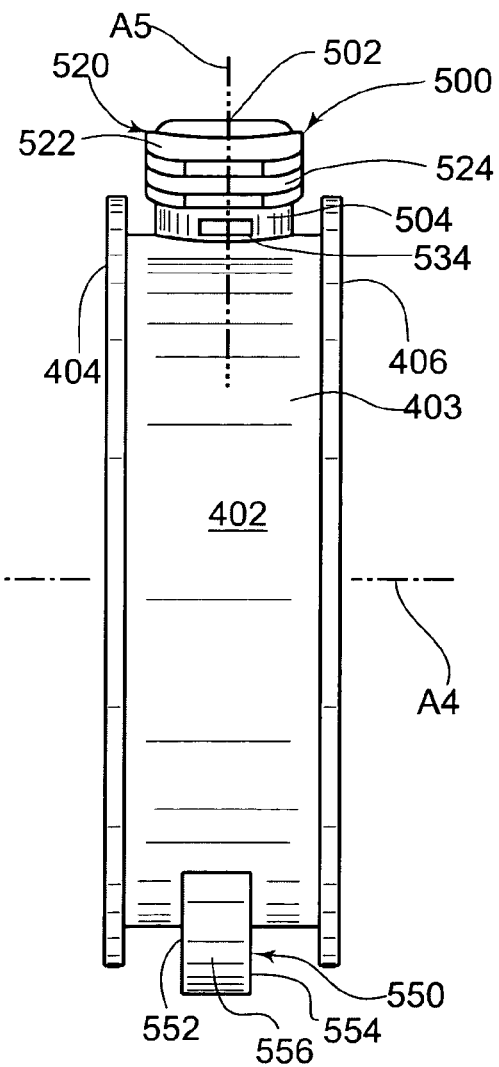
FIG. 11 shows a side elevation view of the hub of FIG. 8.

With reference to FIG. 11, the engine cylinder 504 may define a fifth axis A5. In one exemplary embodiment, the fifth axis A5 may be formed perpendicular to the fourth axis A4. The engine cylinder 504 may be provided with a plurality of fins 520, such as fins 522, 524. The fins 520 may be formed on the engine cylinder 504.

Figure 12:
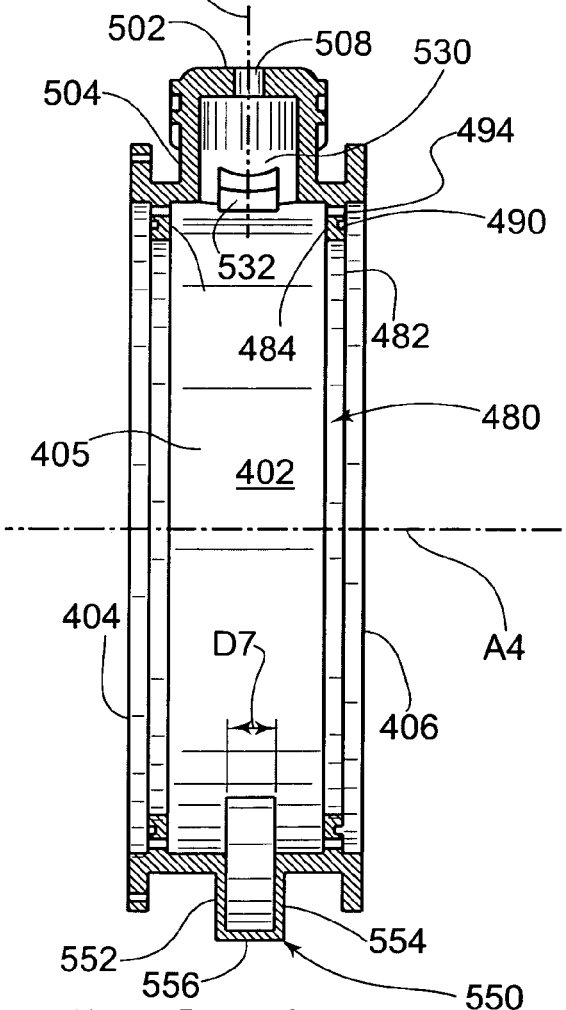
FIG. 12 shows a cross-sectional view take across plane 12—12 of FIG. 10 of the hub of FIG. 8.

With reference to FIG. 12, the engine combustion chamber 530 may be provided with an intake port 532 and an exhaust 534 (FIG. 11). In one exemplary embodiment, the intake port 532 and the exhaust 534 (FIG. 11) may be configured in a manner typical for two-stroke engines. The hub motor 100 may be further provided with a muffler 536 (FIG. 2). The muffler 536 may be attached to the engine exhaust 534. In one exemplary embodiment, the exhaust 534 may be configured such that it defines a substantially long chamber that 'wraps' radial around the hub cylindrical member 402.

With continued reference to FIG. 12, the hub 400 may be provided with a counterbalance 550. The counterbalance 550 may be formed on the outside surface of the hub cylindrical member 402. The counterbalance 550 may be provided with a first face 552 and an oppositely disposed second face 554. The counterbalance 550 may also be provided with a radial member 556. The radial member 556 may be attached to the first and second faces 552, 554. In one exemplary embodiment, the counterbalance 550 may be removably attached to the hub cylindrical member 402. With reference to FIG. 9, the counterbalance 550 may define a fifth distance D5, the fifth distance D5 may be the radius of curvature of the radial member 556. In one exemplary embodiment, the fifth distance D5 may be about 5.0 inches. The vertex of a circle defined by the radial member 556 (having the radius of the fifth distance D5) may be located at a sixth distance D6 from the center of the hub 400 defined by the fourth axis A4. In one exemplary embodiment, the sixth distance D6 may be about 2.75 inches. With reference to FIG. 12, the counterbalance 550 may also define a seventh distance D7, the seventh distance D7 may be the dimension between the insides of the counterbalance first and second faces 552, 554. In one exemplary embodiment, the seventh distance D7 may be about 0.50 inches.

With reference to FIGS. 13–15, the hub motor 100 may be provided with a piston 600. The piston 600 may be provided with a top 602 and a skirt 604. The piston 600 may define a sixth axis A6 located at the center of the skirt 604. The top 602 may integrally formed with the skirt 604. The skirt 604 may be provided with a groove 606 formed near the top 602 of the piston 600. The piston 600 may be further provided with a clevis pin hole 610 extending there through. With reference to FIG. 14, the clevis pin hole 610 may define a seventh axis A7. In one exemplary embodiment, the seventh axis A7 may be perpendicular to the sixth axis A6. The piston 600 may be further provided with an exhaust vane 620 and an oppositely disposed intake vane 622 (FIG. 15). The exhaust and intake vanes 620, 622 may be formed on the skirt 604 at a location oppositely disposed from the top 602. The piston 600 may be further provided with a first stabilizer 630 and an oppositely disposed second stabilizer 632. The stabilizers 630, 632 may be formed on the skirt 604 at a location oppositely disposed from the top 602.

With reference to FIG. 16, the hub motor 100 may be provided with a crank arm 650. The crank arm 650 may be provided with a first hole 652 and an oppositely disposed second hole 654. The first hole 652 may be separated from the second hole 654 by a thirteenth distance D13. In one exemplary embodiment, the thirteenth distance D13 may be about 2.0 inches.

Figure 17:
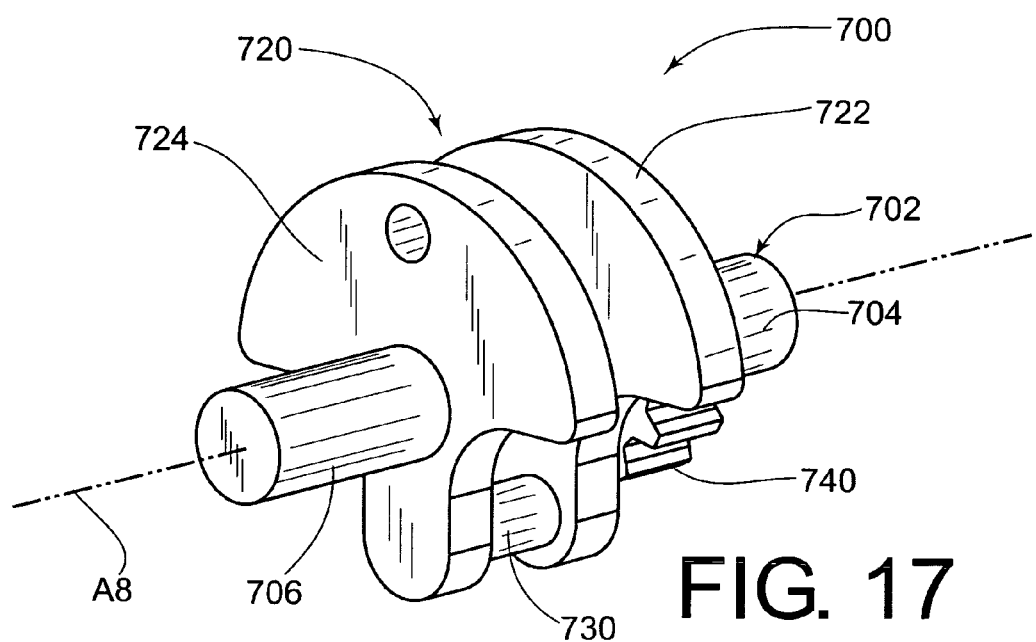
FIG. 17 shows a perspective view of an input assembly.
Figure 18:
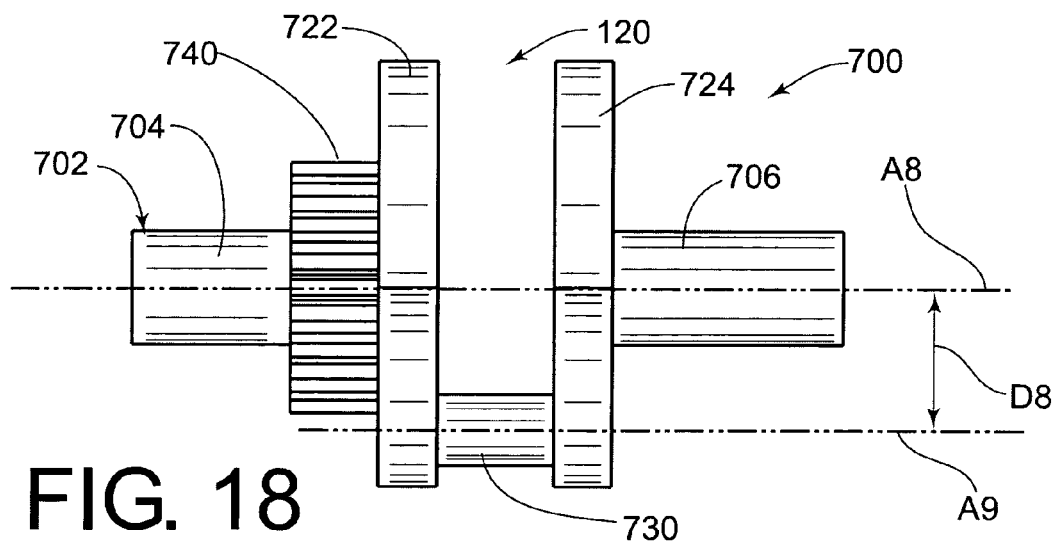
FIG. 18 shows a front elevation view of the input assembly of FIG. 17.
Figure 19:
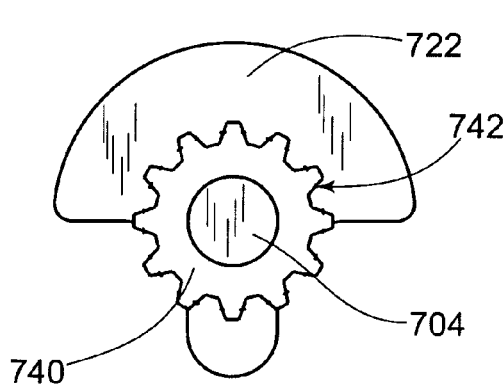
FIG. 19 shows a side elevation view of a first distal end of the input assembly of FIG. 17.
Figure 20:
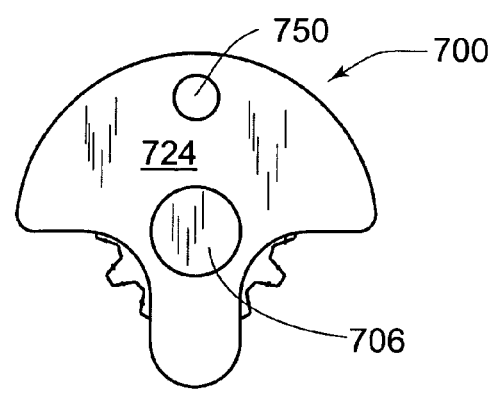
FIG. 20 shows a side elevation view of a second distal end of the input assembly of FIG. 17.

With reference to FIGS. 17–20, the hub motor 100 may be provided with an input assembly 700. The input assembly 700 may be provided with a crankshaft 702 that may include a first portion 704 and a second portion 706. The crankshaft first potion 704 may be separated from (but mechanically connected to) the crankshaft second portion 706 by a crank assembly 720. The crank assembly 700 may include a first crank 722 and a second crank 724. The crank assembly 700 may further include a crank pin 730. The first crank 722 may be attached to, or integrally formed with, the crankshaft first portion 704. The crank pin 730 may be attached to, or integrally formed with, the first crank 722. The second crank 724 may be attached to, or integrally formed with, the crank pin 730. The crankshaft second portion 706 may be attached to, or integrally formed with, the second crank 724. With reference to FIG. 18, the crankshaft 702 may define an eighth axis A8 located at the center thereof. The crank pin 730 may define a ninth axis A9 located at the center thereof. In one exemplary embodiment, the eighth axis A8 may be parallel to the ninth axis A9 and may be separated by an eighth distance D8. In one exemplary embodiment, the eighth distance D8 may be about 0.375 inches. With reference to FIG. 19, the input assembly 700 may be provided with a first gear 740. The first gear 740 may be provided with a plurality of teeth 742 formed in the outermost perimeter thereof. The first gear 740 may be attached to the crankshaft first portion 704. In one exemplary embodiment, the first gear 740 may be a spur gear having a twenty-degree pressure angle and a diametrical pitch of twelve teeth per inch; the gear 740 may have an effective diameter of one inch. With reference to FIG. 20, the input assembly second crank 724 may be provided with a blind hole 750. The blind hole 750 may take the form of a blind hole formed in the input assembly second crank 724.

Figure 21:
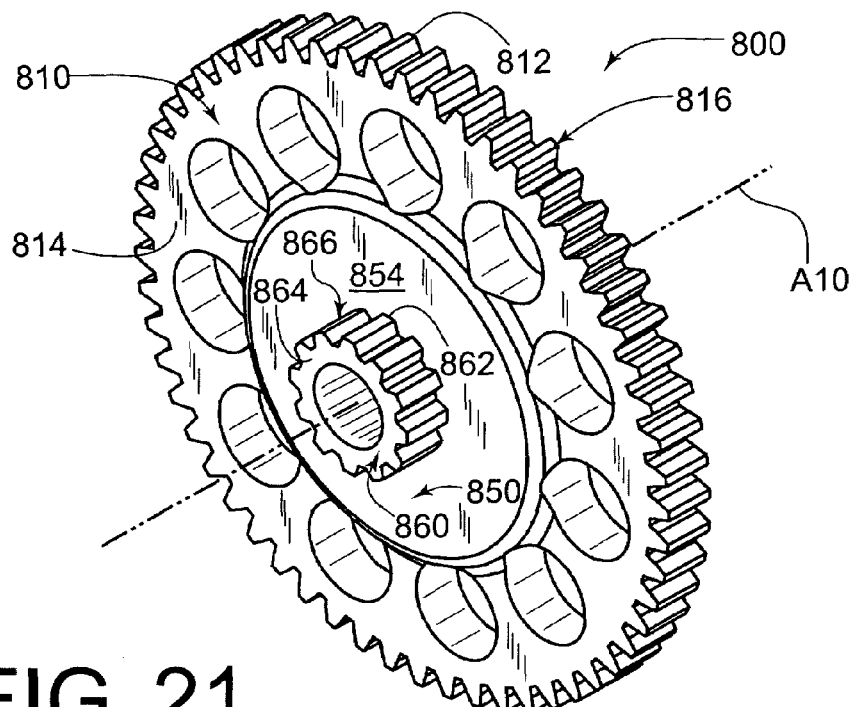
FIG. 21 shows a perspective view of a first gear assembly.

With reference to FIG. 21, the hub motor 100 may be provided with a first gear assembly 800. The first gear assembly 800 may define a tenth axis A10. The first gear assembly 800 may be provided with a second gear 810 and a third gear 860. The second gear 810 may be provided with a first face 812 and an oppositely disposed second face 814. The second gear 810 may be provided with a plurality of teeth 816 formed on the outermost perimeter thereof.

Figure 22:
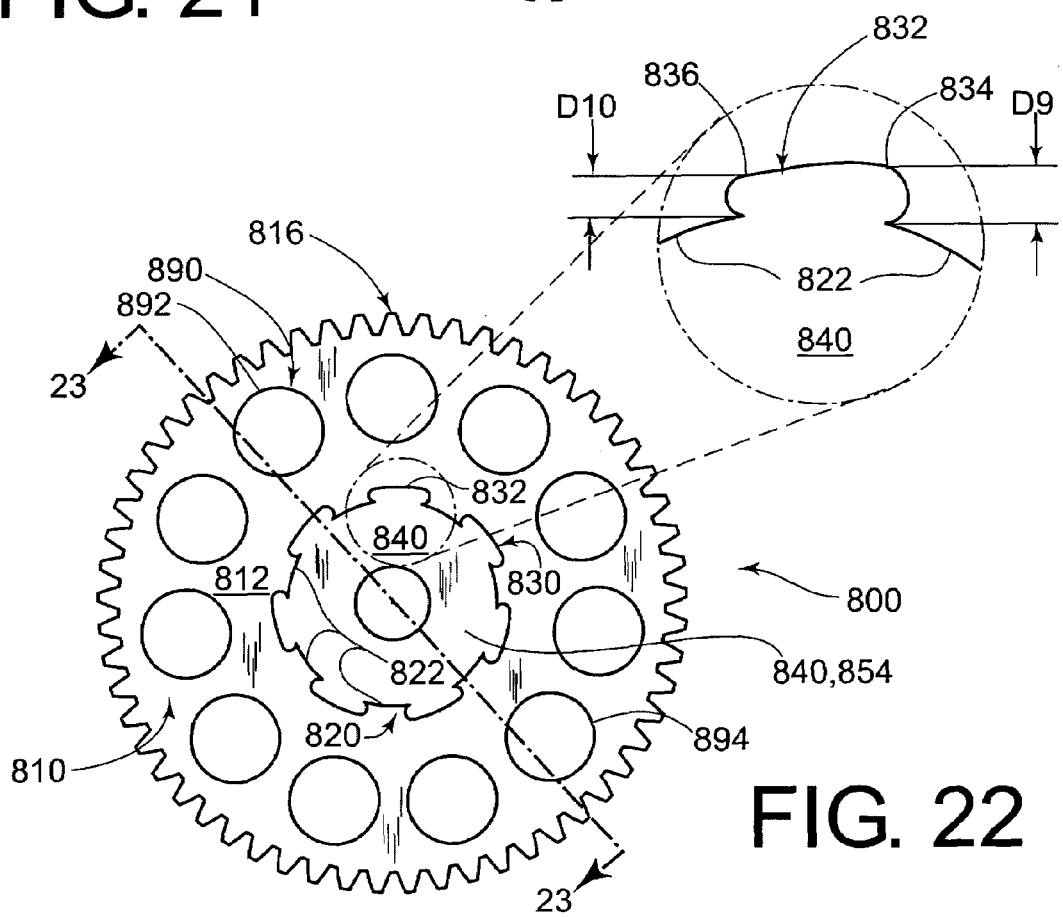
FIG. 22 shows a side elevation view of a first face of the first gear assembly of FIG. 21 with a detail showing an exemplary pin detent.
Figure 23:
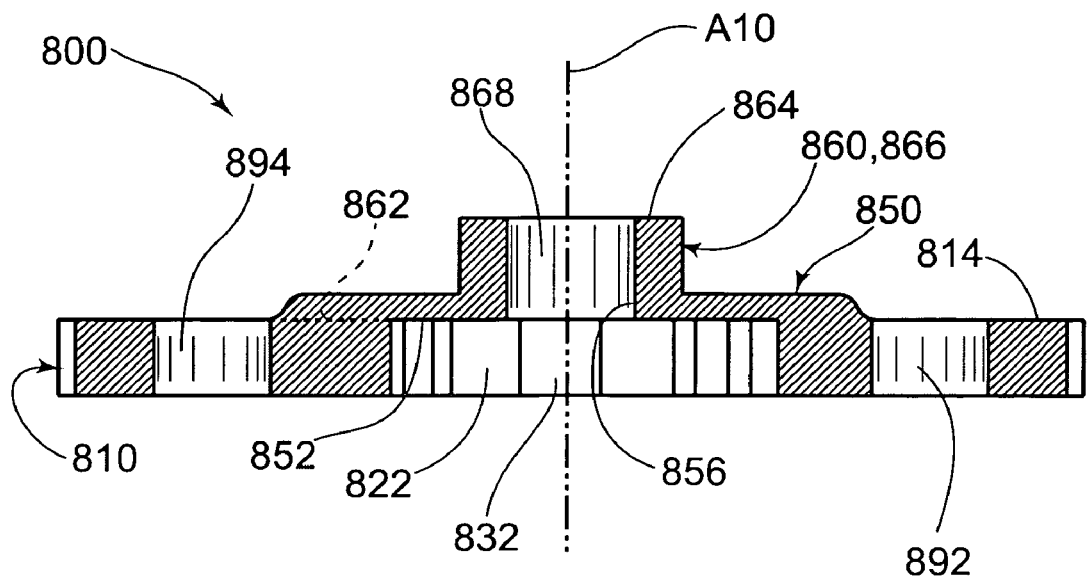
FIG. 23 shows a cross-sectional view taken across plane 23—23 of FIG. 22 of the first gear assembly of FIG. 21.

With reference to FIG. 22, the second gear first surface 812 may be provided with an overrun clutch 820. The overrun clutch 820 may be provided with an inner bearing surface 822. In one exemplary embodiment, the inner bearing surface 822 may be formed with a substantially cylindrical profile that is equidistant from the tenth axis A10. The inner bearing surface 822 may be interrupted by a plurality of pin detents 830, such as pin detent 832. Pin detent 832 may be provided with a first end 834 and an oppositely disposed second end 836. The pin detent first end 834 may define a ninth distance D9. The pin detent second end 836 may define a tenth distance D10. In one exemplary embodiment, the ninth distance D9 may be greater than the tenth distance D10; it is noted that the relationship between the ninth and tenth distances D9, D10 may be reversed depending on overrunning characteristics that are required according to the direction of rotation of the wheel 16. In one exemplary embodiment, the ninth distance D9 may be about 0.135 inches, while the tenth distance D10 may be about 0.110 inches. The overrun clutch 820 may be provided with a bearing face 840; the bearing face 840 may be substantially perpendicular to the tenth axis A10. With reference to FIG. 23, the first gear assembly 800 may be provided with a protrusion 850 formed on the second gear second face 814. The protrusion 850 may be provided with a first face 852 and an oppositely disposed second face 854. Additionally, the protrusion 850 may be provided with a hole 856 there through. The protrusion first face 852 may be located on the same plane as the overrun clutch bearing face 840 and the second gear second face 814. In one exemplary embodiment, the second gear 810 may be a spur gear having a twenty-degree pressure angle and a diametrical pitch of twelve teeth per inch; the second gear 810 may have an effective diameter of 4.75 inches.

Figure 24:
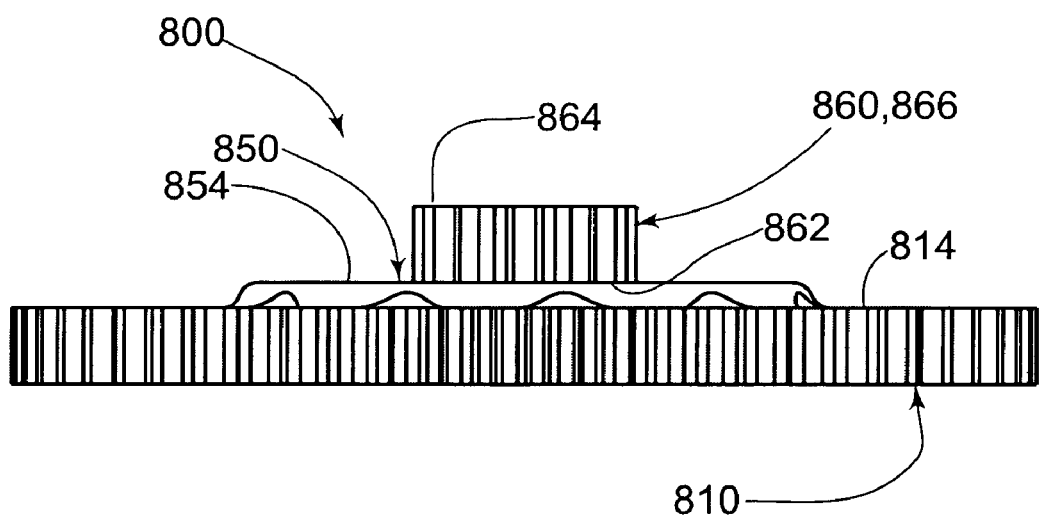
FIG. 24 shows a side elevation view of the first gear assembly of FIG. 21.

With reference to FIGS. 23 and 24, the third gear 860 may be provided with a first face 862 and an oppositely disposed second face 864. The third gear 860 may be provided with a plurality of teeth 866 formed on the outermost perimeter thereof. The third gear 860 may also be provided with a hole 868 (FIG. 23) there through. In one exemplary embodiment, the third gear first face 862 may be located on the same plane as the first gear assembly protrusion second face 854. In one exemplary embodiment, the third gear 860 may be press-fit onto a protrusion (not shown) formed on the second gear 810 due to manufacturing considerations. In one exemplary embodiment, the third gear 860 may be a spur gear having a twenty-degree pressure angle and a diametrical pitch of twelve teeth per inch; the third gear 860 may have an effective diameter of one inch.

With reference to FIG. 22, the first gear assembly 800 may be provided with a plurality of holes 890, such as holes 892, 894. The plurality of holes 890 may reduce the overall weight of the first gear assembly 800.

Figure 25:
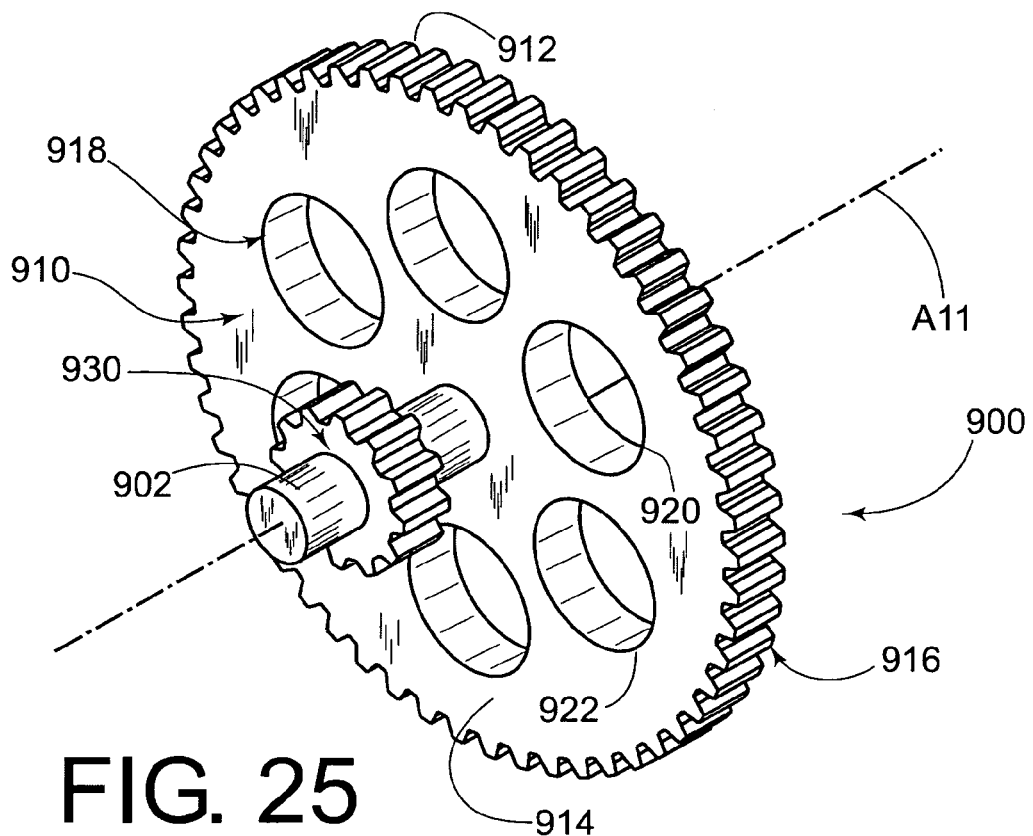
FIG. 25 shows a perspective view of a second gear assembly.
Figure 26:
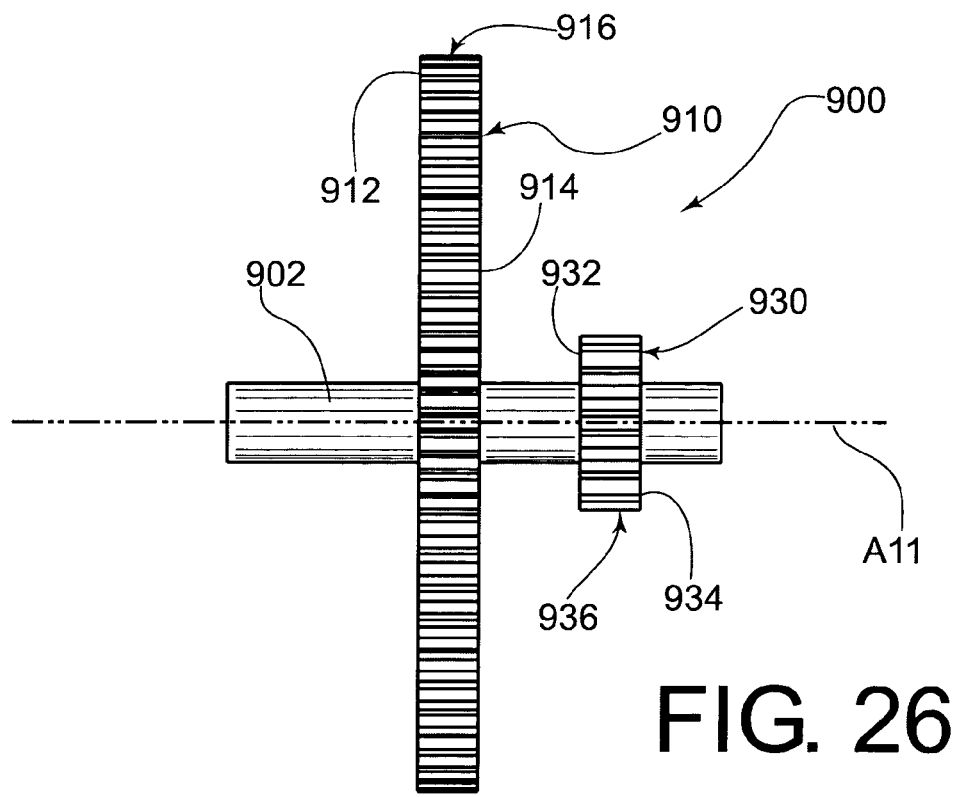
FIG. 26 shows a side elevation view of the second gear assembly of FIG. 25.
Figure 27:
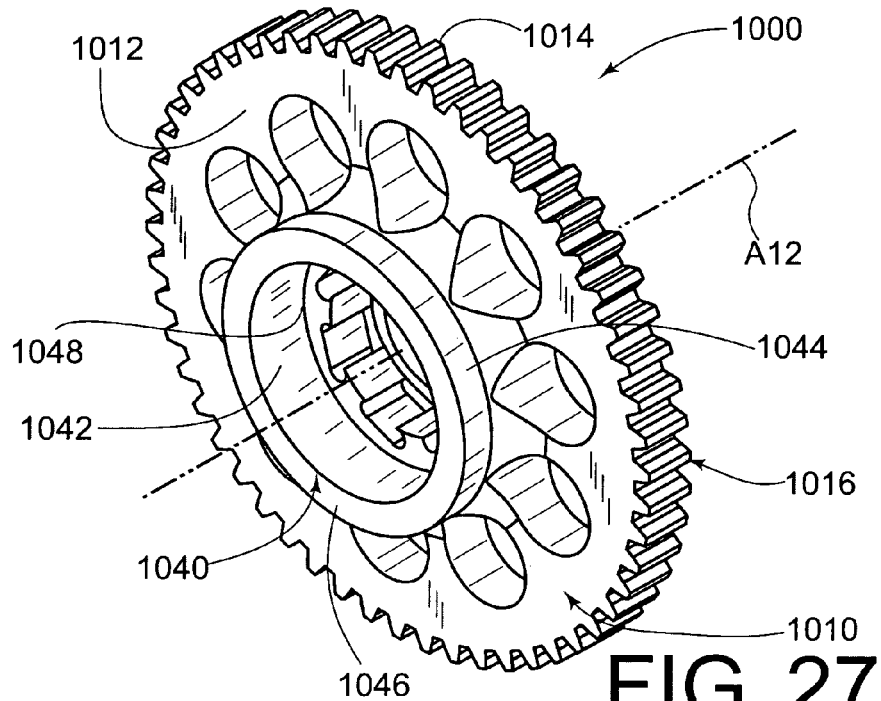
FIG. 27 shows a perspective view of a third gear assembly.

With reference to FIGS. 25 and 26, the hub motor 100 may be provided with a second gear assembly 900. The second gear assembly 900 may be provided with a shaft 902 defining an eleventh axis A11. The second gear assembly 900 may be further provided with a fourth gear 910 and a fifth gear 930. The fourth gear 910 may be provided with a first face 912 and an oppositely disposed second face 914. The fourth gear 910 may be provided with a plurality of teeth 916 formed on the outermost perimeter thereof. The fourth gear 910 may be fixedly attached to the shaft 902 in any one of a number of ways, such as with a setscrew (not shown) or with a press-fit. In one exemplary embodiment, the fourth gear 910 may be a spur gear having a twenty-degree pressure angle and a diametrical pitch of twelve teeth per inch; the fourth gear 910 may have an effective diameter of about 4.50 inches.

With reference to FIG. 25, the second gear assembly fourth gear 910 may be provided with a plurality of holes 918, such as holes 920, 922. The plurality of holes 918 may reduce the overall weight of the second gear assembly 900.

With reference to FIG. 26, the second gear assembly fifth gear 930 may be provided with a first face 932 and an oppositely disposed second face 934. The fifth gear 930 may be provided with a plurality of teeth 936 formed on the outermost perimeter thereof. The fifth gear 930 may be fixedly attached to the shaft 902 in any one of a number of ways, such as with a setscrew (not shown) or with a press-fit. In one exemplary embodiment, the fifth gear 930 may be a spur gear having a twenty-degree pressure angle and a diametrical pitch of twelve teeth per inch; the fifth gear 930 may have an effective diameter of one inch.

Figure 28:
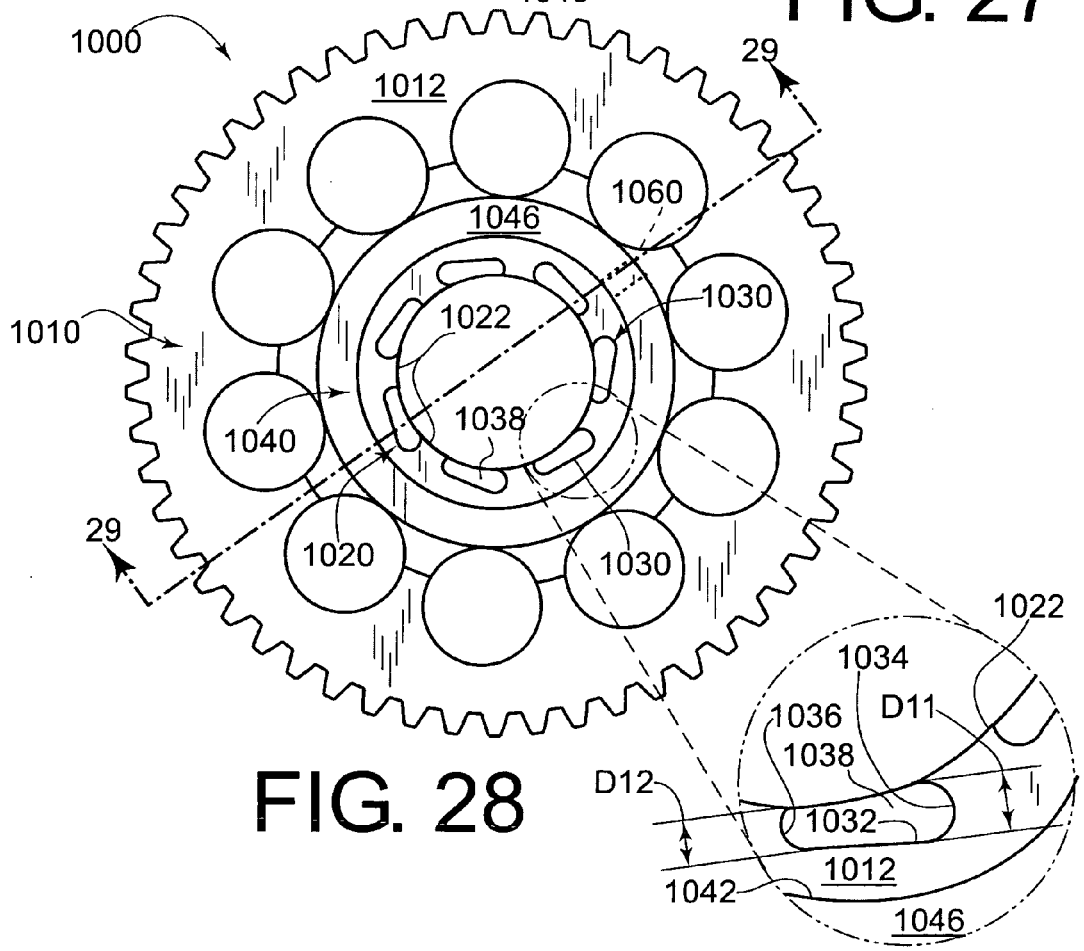
FIG. 28 shows a front elevation view of the third gear assembly of FIG. 27 with a detail showing an exemplary pin detent.

With reference to FIGS. 27–31, the hub motor 100 may be provided with a third gear assembly 1000. The third gear assembly 1000 may define a twelfth axis A12. The third gear assembly 1000 may be provided with a sixth gear 1010. The sixth gear 1010 may be provided with a first face 1012 and an oppositely disposed second face 1014. The sixth gear 1010 may be provided with a plurality of teeth 1016 formed on the outermost perimeter thereof. With reference to FIG. 28, the sixth gear first surface 1012 may be provided with an overrun clutch 1020. The overrun clutch 1020 may be provided with an inner bearing surface 1022. In one exemplary embodiment, the inner bearing surface 1022 may be formed with a substantially cylindrical profile that is equidistant from the twelfth axis A12. The inner bearing surface 1022 may be interrupted by a plurality of pin detents 1030, such as pin detent 1032. Pin detent 1032 may be provided with a first end 1034 and an oppositely disposed second end 1036. The pin detent first end 1034 may define an eleventh distance D11. The pin detent second end 1036 may define a twelfth distance D12. In one exemplary embodiment, the eleventh distance D11 may be greater than the twelfth distance D12; it is noted that the relationship between the eleventh and twelfth distances D11, D12 may be reversed depending on overrunning characteristics that are required. In one exemplary embodiment, the eleventh distance D1 may be about 0.135 inches, while the twelfth distance D12 may be about 0.110 inches.

Figure 29:
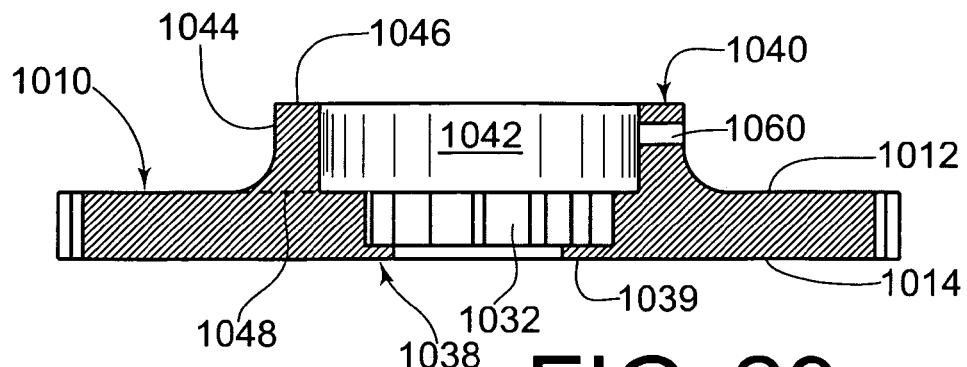
FIG. 29 shows a cross-sectional view take across plane 29—29 of FIG. 28 of the third gear assembly of FIG. 27.
Figure 30:
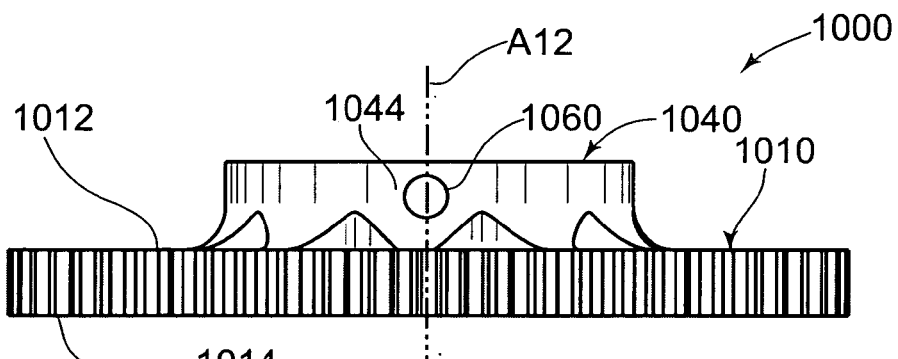
FIG. 30 shows a side elevation view of the third gear assembly of FIG. 27.

With reference to FIG. 29, the third gear assembly 1000 may be provided with a starter protrusion 1040. The starter protrusion 1040 may take the form of a cylinder defining an inside surface 1042 and an outside surface 1044. The starter protrusion 1040 may be further provided with a first face 1046 and an oppositely disposed second face 1048. The starter protrusion 1040 may be formed on the third gear assembly 1000 such that the starter protrusion second surface 1048 resides in the same plane as the sixth gear first surface 1012. Furthermore, the starter protrusion inside surface 1042 may be formed with a substantially cylindrical profile that is equidistant from the twelfth axis A12. The starter protrusion 1040 may be provided with a threaded hole 1060 extending from the outside surface 1044 to the inside surface 1042. In one exemplary embodiment, the sixth gear 1010 may be a spur gear having a twenty-degree pressure angle and a diametrical pitch of twelve teeth per inch; the sixth gear 1010 may have an effective diameter of 4.50 inches.

Figure 31:
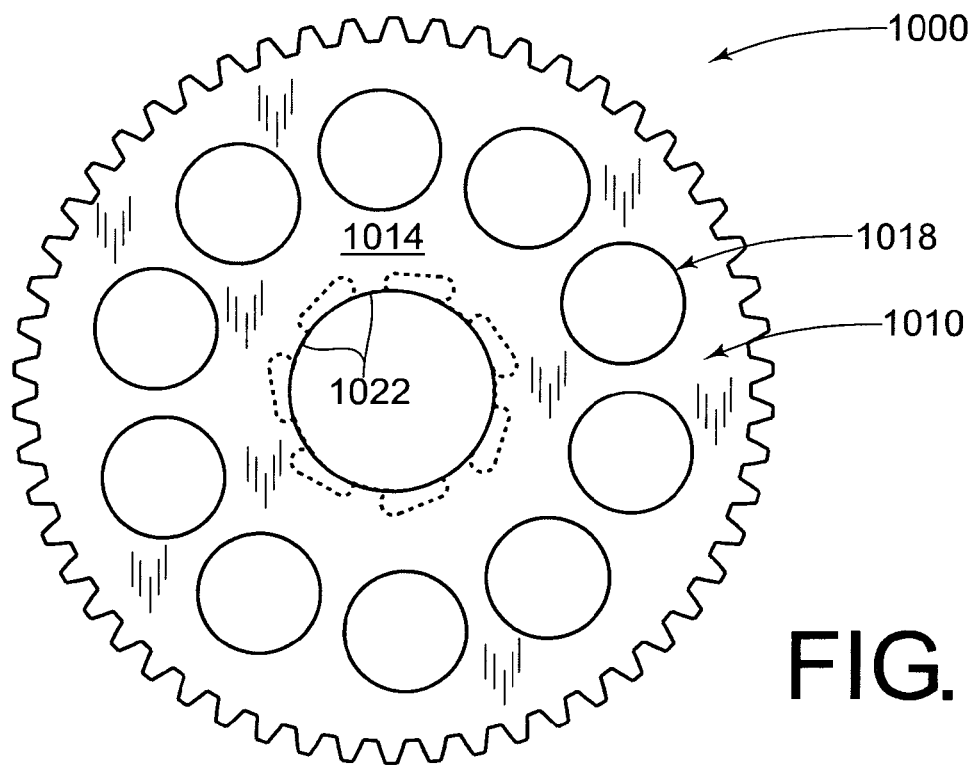
FIG. 31 shows a back elevation view of the third gear assembly of FIG. 27.

With reference to FIG. 31, the third gear assembly 1000 may be provided with a plurality of holes 1018. The plurality of holes 1018 may reduce the overall weight of the third gear assembly 1000.

With reference to FIG. 32, the hub motor 100 may be provided with an overdrive cover 1100. The overdrive cover 1100 may define a thirteenth axis A13. The overdrive cover 1100 may be provided with a first face 1102 and an oppositely disposed second face 1104. The overdrive cover 1100 may be provided with a center hole 1110 located at the center thereof and extending from the first face 1102 to the second face 1104. The overdrive cover center hole 1110 may be formed with a substantially cylindrical profile that is equidistant from the thirteenth axis A13. The overdrive cover 1100 may be further provided with an attachment hole 1120.

The attachment hole 1120 may be formed in-between the first face 1102 and the second face 1104. The attachment hole 1120 may also be formed with a threaded portion for receiving a setscrew (not shown) therein. The overdrive cover 1100 may be provided with a first post 1130 and a second post 1140. The first post 1130 may be formed on the second face 1104. The first post 1130 may take a substantially cylindrical form defining a central axis that is parallel to the thirteenth axis A13. The second post 1140 may be formed on the second face 1104. The second post 1140 may take a substantially cylindrical form defining a central axis that is parallel to the thirteenth axis A13.

With reference to FIG. 33, the hub motor 100 may be provided with a plurality of pads 1150, such as pad 1152. Although only pad 1152 will be described herein, it is to be understood that pad 1152 may be substantially similar to the plurality of pads 1150. The pad 1152 may be provided with a first face 1154 and an oppositely disposed second face 1156. The pad 1152 may be further provided with an internal surface 1160 and an external surface 1162. The pad 1152 may be provided with an attachment hole 1158. The attachment hole 1158 may be formed in the pad 1152 and extend from the first face 1154 to the second face 1156. Furthermore, the attachment hole 1158 may define a central axis that may be substantially parallel to the internal and external surfaces 1160, 1162.

With reference to FIG. 34, the hub motor 100 may be provided with an overdrive disk 1200. The overdrive disk 1200 may define a fourteenth axis A14. The overdrive disk 1200 may be provided with a first face 1202 and an oppositely disposed second face 1204. The overdrive disk 1200 may be further provided with an internal surface 1206 and an oppositely disposed external surface 1208. The overdrive disk internal and external surfaces 1206, 1208 may be formed with a substantially cylindrical profiles that are, respectively, equidistant from the fourteenth axis A14.

With continued reference to FIG. 34, the hub motor 100 may also be provided with a starter disk 1250 (which may be substantially similar to the overdrive disk 1200). The starter disk 1250 may define a fifteenth axis A15. The starter disk 1250 may be provided with a first face 1252 and an oppositely disposed second face 1254. The starter disk 1250 may be further provided with an internal surface 1256 and an oppositely disposed external surface 1258. The starter disk internal and external surfaces 1256, 1256 may be formed with a substantially cylindrical profile that are, respectively, equidistant from the fifteenth axis A15. It is noted that although the starter disk 1250 and the overdrive disk 1200 may take similar forms, their actual dimensions may be adjusted as required.

Having provided exemplary members of one embodiment of the hub motor 100, a description of an exemplary assembled will now be provided.

Figure 35:
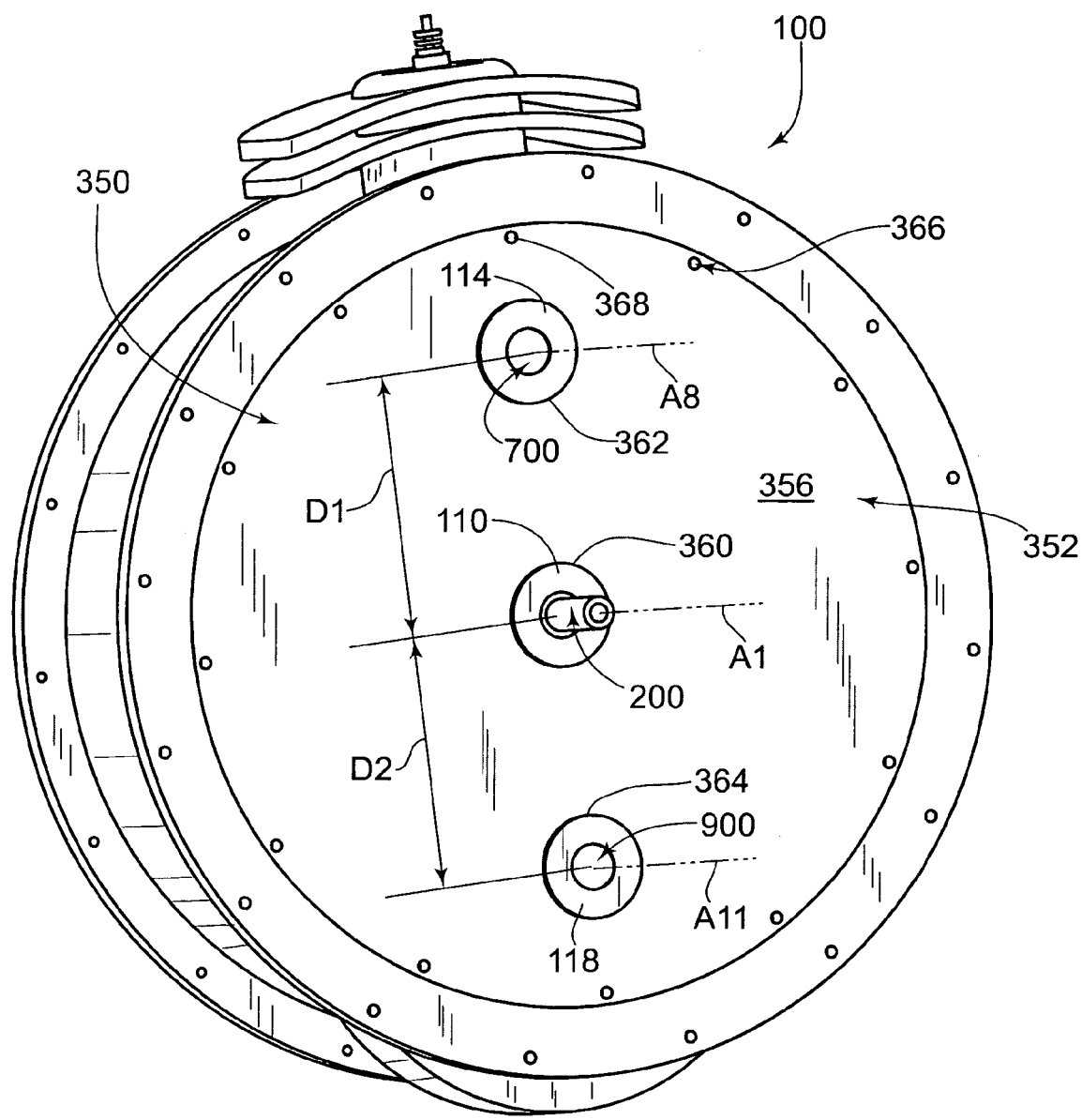
FIG. 35 shows a perspective view of the hub motor of FIG. 2.

With reference to FIG. 35, the hub motor 100 may be configured such that the first cover 352 may be rotationally attached to the axle assembly 200 by a first bearing 110. The first bearing 110 may be adjacent to both the first bearing mount 360 and the axle assembly first surface 214 (FIG. 3). The second cover 372 (FIG. 7) may be rotationally attached to the axle assembly 200 by a second bearing 112 (FIG. 38). The second bearing 112 may be inserted into both the second cover first bearing mount 380 (FIG. 7) and the axle assembly fourth surface 260 (FIG. 3). With continued reference to FIG. 35, the hub 400 may be fixedly attached to the cover plates 350 by screws (not shown). The first cover 352 may be attached to the hub 400 via the plurality of attachment holes 366 and the plurality of hub holes 460 (FIG. 9) through which the screws may be inserted. The second cover 372 may be attached to the hub 400 via the plurality of attachment holes 386 and the plurality of hub holes 492 (FIG. 8) through which screws may be inserted. Attachment of the hub 400 to the cover plates 350 thereby allows the hub 400 to rotate about the axle assembly 200. It should be noted that the cover plates 350 may be attached such that the bearing mounts (e.g. first cover bearing mounts 360, 362, 364 and the second cover bearing mounts 380, 382, 384) are in-line with the fifth axis A5 (FIG. 9).

With continued reference to FIG. 35, the hub motor 100 may be further assembled by rotationally attaching the input assembly 700 to the cover plates 350. The input assembly 700 may be rotationally attached to the first cover plate 352 by a third bearing 114. The third bearing 114 may be adjacent to both the second bearing mount 362 and the crank assembly first portion 704 (FIG. 17). The input assembly 700 may be rotationally attached to the second cover plate 372 by a fourth bearing 116 (FIG. 38). The fourth bearing 116 may be adjacent to both the second bearing mount 382 (FIG. 7) and the crank assembly second portion 706 (FIG. 17).

With continued reference to FIG. 35, the hub motor 100 may be further assembled by rotationally attaching the second gear assembly 900 to the cover, plates 350. The second gear assembly 900 may be rotationally attached to the first cover plate 352 by a fifth bearing 118. The fifth bearing 118 may be adjacent to both the third bearing mount 364 and the second gear assembly shaft 902 (FIG. 25). The second gear assembly 900 may be rotationally attached to the second cover plate 372 by a sixth bearing 120 (FIG. 38). The sixth bearing 120 may be adjacent to both the third bearing mount 384 (FIG. 7) and the second gear assembly shaft 902.

Figure 36:
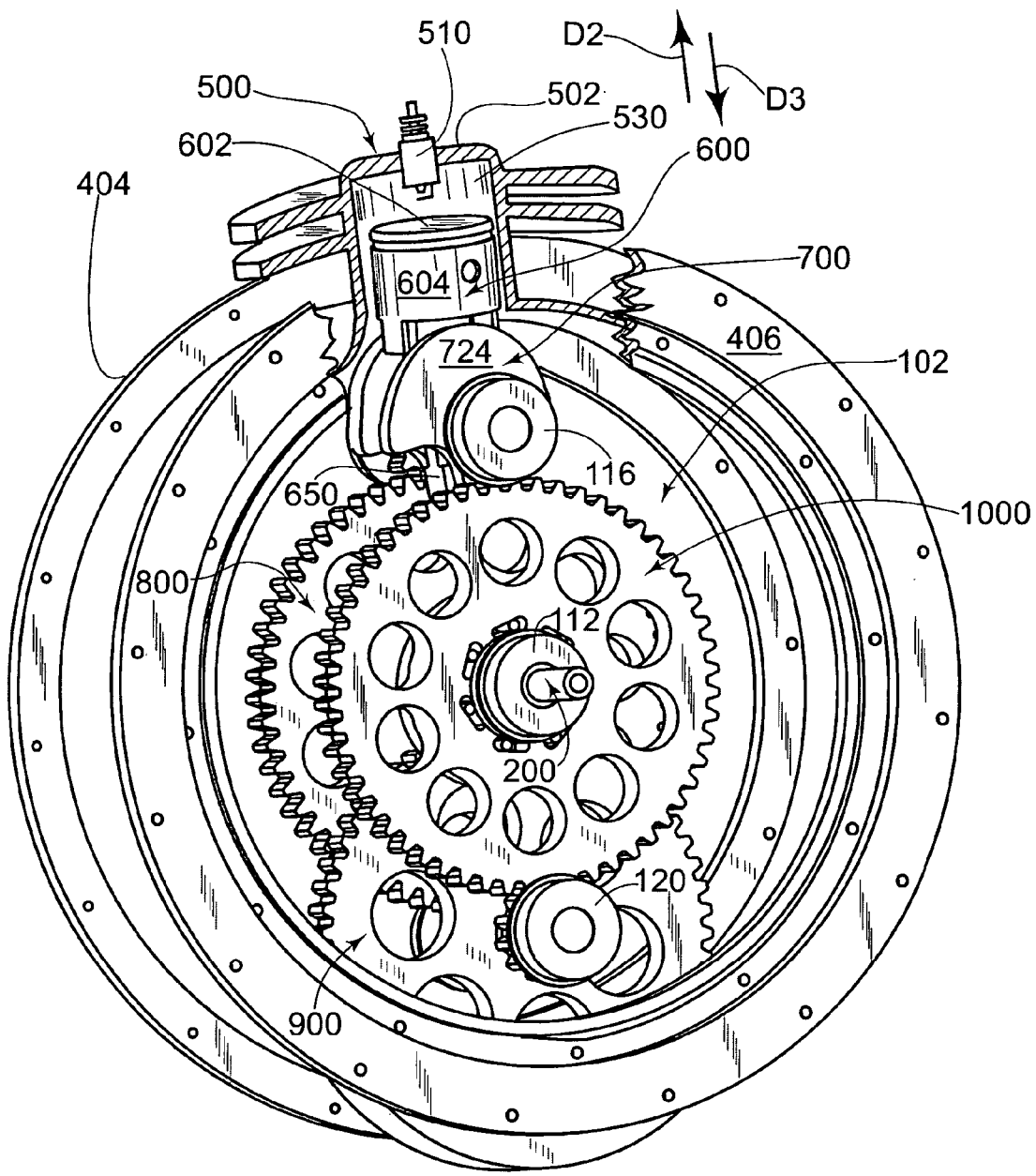
FIG. 36 shows a perspective view of the hub motor of FIG. 35 with covers removed therefrom and a portion of an engine shown in cross-sectional form.

With reference to FIG. 36, the exemplary assembly of the hub motor 100 may be further described by showing the assembly with the covers 350 removed there from. As shown, the axle assembly 200 provides a central member about which all the components may rotate (the exception being driving conditions when the third gear assembly and/or the first gear assembly may be drivingly engaged to the axle assembly 200, such situation will be described later herein). The description of the exemplary assembly of the hub motor 100 may continue by beginning at the piston 600 and working through the assembly to the axle assembly 200. The piston 600 may be assembled such that the skirt 604 may be in slidable contact with the engine cylinder combustion chamber 530. The piston 600 may be assembled such that the top 602 may be movable adjacent to the engine head 502. The piston 600 may be assembled into the engine 500 such that the exhaust vane 620 (FIG. 13) may slide across the engine exhaust 534 (FIG. 11). The piston 600 may also be assembled into the engine 500 such that the intake vane 622 (FIG. 15) may slide across the engine intake port 532 (FIG. 11). The piston 600 may also be assembled into the engine 500 such that the piston seventh axis A7 (FIG. 15) is substantially parallel to the hub fourth axis A4 (FIG. 12). The piston 600 may also be assembled into the engine 500 such that the piston sixth axis A6 (FIG. 15) is substantially parallel to the hub fifth axis A5 (FIG. 12). Furthermore, a ring (not shown) may be installed on the piston groove 606 (FIG. 13).

Figure 37:
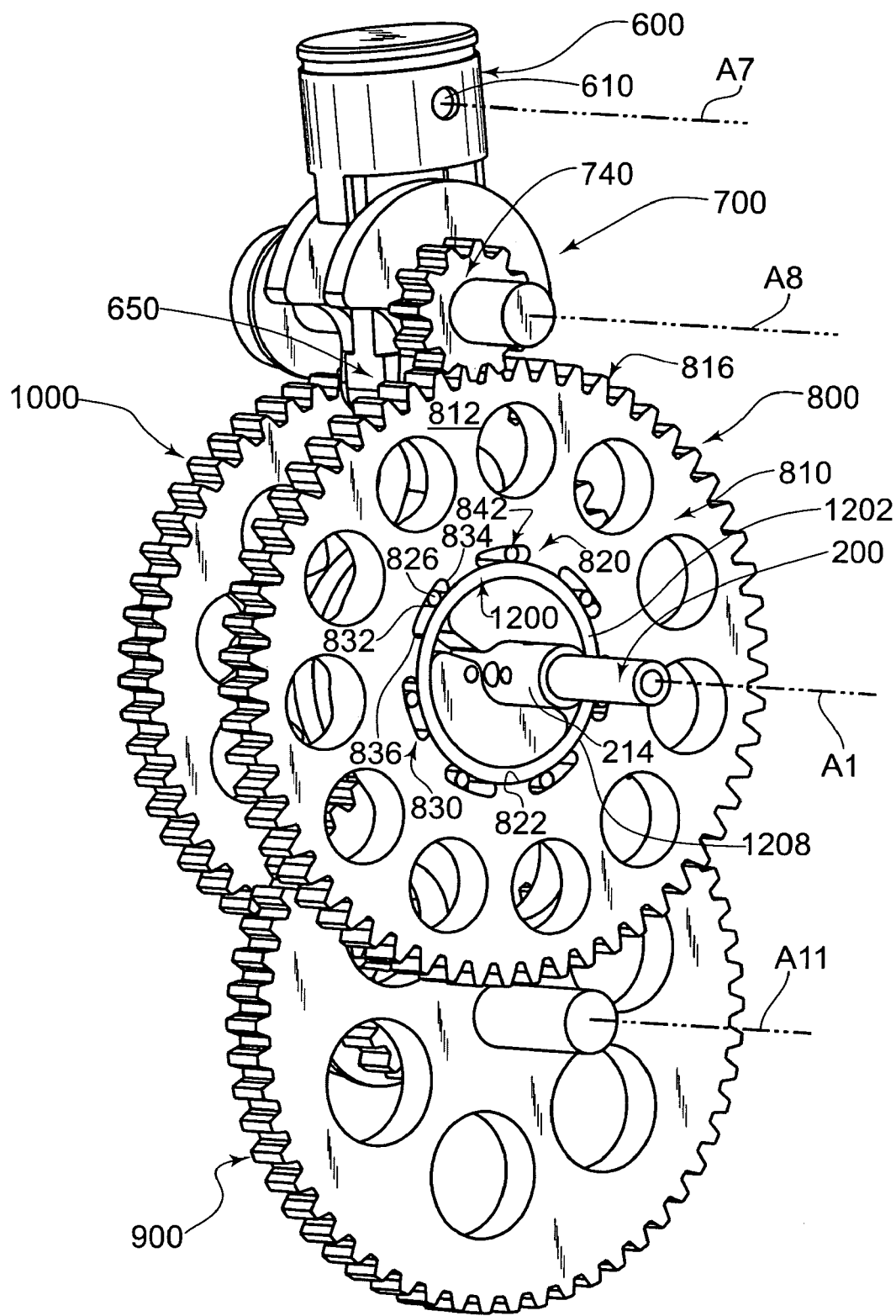
FIG. 37 shows a perspective view an exemplary embodiment of an assembly contained within the hub motor of FIG. 35.

With reference to FIG. 37, the hub motor 100 may be further assembled by attaching the crank arm 650 to the piston 600. The assembly of the crank arm 650 to the piston 600 may occur by-way-of a clevis pin (not shown). The clevis pin may contact the clevis pin hole 610 and the crank arm first hole 652 (FIG. 16). Such attachment of the crank arm 650 to the piston 600 allow the crank arm 650 to pivot about the piston seventh axis A7.

With continued reference to FIG. 37, the hub motor 100 may be further assembled by attaching the crank arm 650 to the input assembly 700. Such attachment of the crank arm 650 to the input assembly 700 may be a pivotable connection. The crank arm second hole 654 (FIG. 16) may contact the crank pin 730 (FIG. 17). Such attachment of the crank arm 650 to the input assembly 700 may allow the crank arm 650 to pivot about the input assembly ninth axis A9 (FIG. 18).

The configuration of the hub motor 100 may allow for the input assembly first gear 740 to be drivingly engaged with the first gear assembly second gear 810. This configuration may result in rotation of the input assembly 700 being transferred to the first gear assembly 800 by-way-of the first gear teeth 742 second gear teeth 816.

The hub motor 100 may be further assembled by rotationally attaching the first gear assembly 800 to the axle assembly 200. As shown in FIG. 37, the assemblage of the first gear assembly 800 and the axle assembly 200 may result in the first gear assembly protrusion hole 856 (FIG. 23) and the first gear assembly third gear hole 868 (FIG. 23) being in contact with the axle assembly first surface 214. The first gear assembly 800 may be assembled with the axle assembly 200 such that the first gear assembly third gear second face 864 (FIG. 21) is adjacent to the axle assembly first protrusion first face 218 (FIG. 3).

With reference to FIG. 38, the hub motor 100 may be further assembled such that the second gear assembly 900 is drivingly engaged with the first gear assembly 800. This drivable engagement may be provided by placing the first gear assembly third gear 860 into contact with the second gear assembly fourth gear 910. Such contact between the third gear 860 and the fourth gear 910 may occur by the third gear teeth 866 contacting the fourth gear teeth 916. This contact of the teeth 866, 916 may render the first gear assembly 800 drivable engaged with the second gear assembly 900.

With continued reference to FIG. 38, the hub motor 100 may be further assembled such that the third gear assembly 1000 is drivingly engaged with the second gear assembly 900. This drivable engagement may be provided by placing the second gear assembly fourth gear 930 into contact with the third gear assembly fifth gear 1010. Such contact between the fourth gear 930 and the fifth gear 1010 may occur by the fourth gear teeth 936 contacting the fifth gear teeth 1016. This contact of the teeth 936, 1016 may render the second gear assembly 900 drivably engaged with the third gear assembly 1000.

The hub motor 100 may be further assembled by rotationally attaching the third gear assembly 1000 to the axle assembly 200. As shown in FIG. 38, the assemblage of the third gear assembly 1000 and the axle assembly 200 may result in the third gear assembly inner bearing surface 1022 (FIG. 28) being in contact with the axle assembly third surface 250 (FIG. 3).

The third gear assembly 1000 may be assembled with the axle assembly 200 such that the third gear assembly pin flange 1038 (FIG. 28) is essentially coplanar with the axle assembly third shoulder 262 (FIG. 3). Furthermore, the starter protrusion second face 1048 (FIG. 29) may be coplanar with the axle assembly second protrusion second face 240 (FIG. 3). The third gear assembly 1000 may be rotationally attached to the axle assembly 200 via the starter disk 1250 (FIG. 34). The starter disk 1250 may be into the assembly such that the starter disk external surface 1258 contacts the third gear assembly starter protrusion inside surface 1042 (FIG. 29). The starter disk 1250 may be further assembled such that the starter disk second surface 1254 (FIG. 29) contacts the axle assembly second protrusion first face 238 (FIG. 3). The starter disk 1250 may be fixedly attached to the third gear assembly 1000 by a setscrew (not shown) inserted through the third gear assembly threaded hole 1060. The setscrew may be tightened such that the starter disk 1250 may not rotate with respect to the third gear assembly 1000. The starter disk 1250 may allow for rotational attachment of the third gear assembly 1000 to the axle assembly 200 about the first axis A1, while limiting nonconforming translation along the first axis A1.

With reference to FIG. 37, the first gear assembly overrun clutch 820 may be assembled by placing a plurality of pins 824 into the plurality of pin detents 830, such as pin 826 being placed into pin detent 832. The description provided herein will be directed to the single pin 826 and pin detent 832, it should be understood that this description is adequate for describing the plurality of pins 824 and pin detents 830. The pin 826 may be placed in pin detent 832 such that the pin 826 is captured between the pin detent 832 and the overdrive disk 1200. It should be noted that in one exemplary embodiment, the overdrive disk first face 1202 may be positioned adjacent to the first gear assembly first face 812. Such adjacent placement of the overdrive disk 1200 to the first gear assembly 800 may result in the overdrive disk external surface 1208 being slidably adjacent to the first gear assembly inner bearing surface 822. Furthermore this adjacent placement may also place the overdrive disk second face 1204 (FIG. 34) adjacent to the first gear assembly bearing face 840 (FIG. 22). This captured placement of the pin 826 may allow the pin to exert contact force on both the pin detent 832 and the overdrive disk external surface 1208 if the pin 826 is positioned near the pin detent second end 836. However, if the pin 286 is positioned near the pin detent first end 834, the pin 826 does not exert substantial forces on the pin detent 832 and the overdrive disk external surface 1208. In one embodiment, the assembly may be provided with a small spring (not shown) that urges the pin 826 away from the pin detent first end 834. It should be apparent to those skilled in the art that this overrun clutch 820 may allow rotational movement between the first gear assembly 800 and the overdrive disk 1200 when rotating in one direction, however not allowing rotational movement when rotating in the opposite direction.

Figure 39:
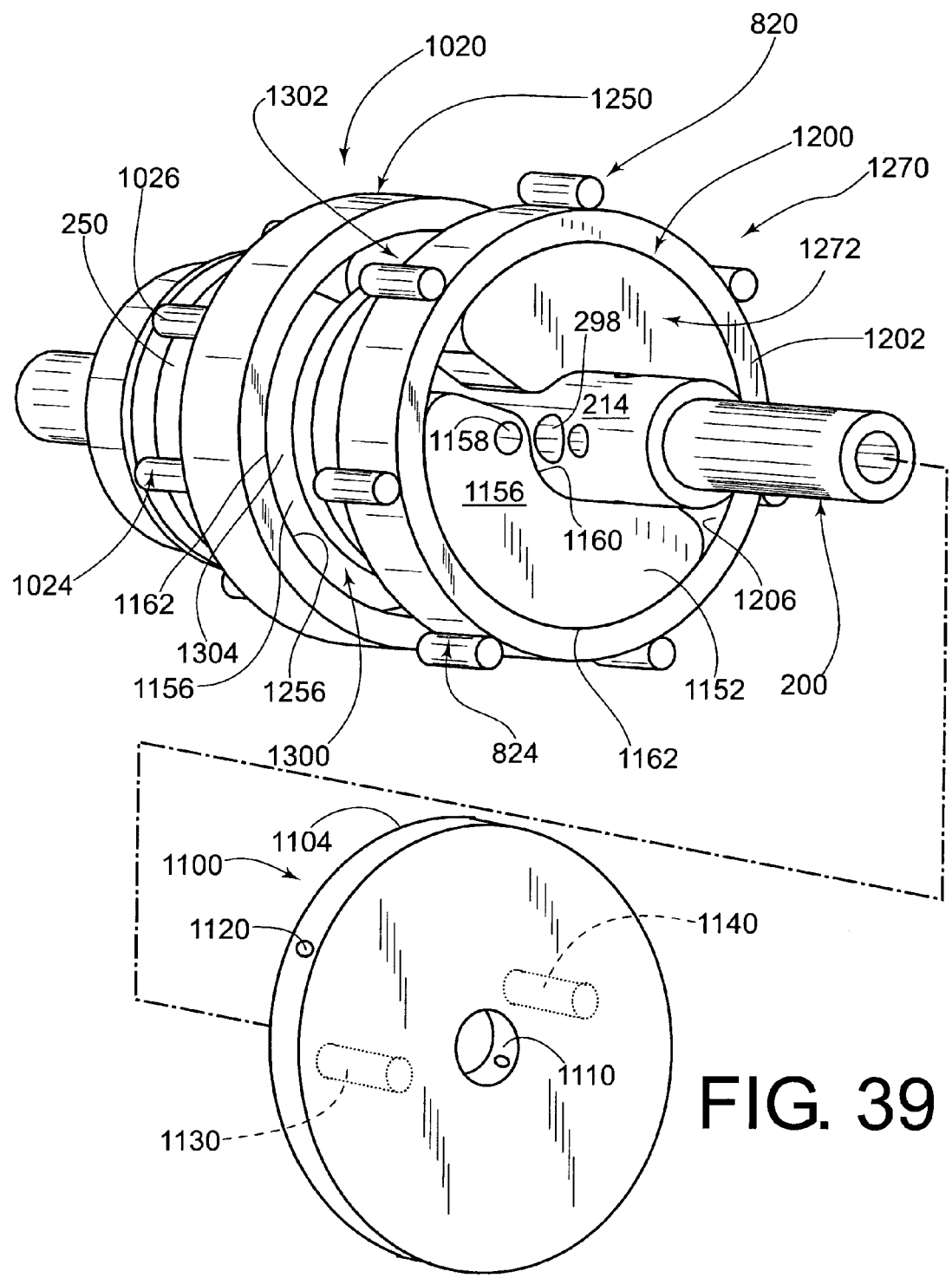
FIG. 39 shows a perspective view of an exemplary starter assembly and an exemplary overdrive assembled with the exemplary axle assembly of FIG. 3.

With reference to FIG. 39, the hub motor 100 may be further assembled by providing an overdrive 1270. The overdrive 1270 may be assembled by placing a pair of pads 1272 between the axle assembly 200 and the overdrive disk 1200. It is noted that the assemblage of one pad will be provided, it should be understood that the second pad may be assembled in a similar manner. Pad 1152 may be assembled with the first gear assembly 800 and the overdrive disk 1200 such that the pad first face 1154 (FIG. 33) may be adjacent to the first gear assembly bearing face 840 (FIG. 22). Furthermore, the pad internal surface 1160 may be adjacent to the axle assembly first surface 214, and the pad external surface 1162 may be adjacent to the overrun clutch internal surface 1206.

With continued reference to FIG. 39, the overdrive 1270 may be further assembled by installing the overdrive cover 1100 to capture the pins 824 and the pads 1272. The overdrive cover 1100 may be positioned such that the center hole 1110 thereof contacts the axle assembly first surface 214. The overdrive cover 1100 may be positioned such that the overdrive cover second face 1104 may contact the overdrive disk first face 1202, the first gear assembly first face 812 (FIG. 37), and the pad second face 1156. Furthermore, the overdrive cover first post 1130 may be placed into contact with the pad hole 1158. The second pad of the pair of pads 1272 may be captured in a similar manner by the overdrive cover second post 1140. The overdrive cover 1100 may be positioned on the axle assembly 200 such that the overdrive cover attachment hole 1120 aligns with the axle assembly overdrive cover hole 298. An attachment pin (not shown) may be placed into the overdrive cover attachment hole 1120 and positioned through the axle assembly overdrive cover hole 298 to secure the overdrive cover 1100 and all parts interfaced therewith. This attachment pin may be anchored into position by a pair of setscrews (not shown) threaded into the overdrive cover attachment hole 1120.

With continued reference to FIG. 39, the third gear assembly overrun clutch 1020 may be assembled by placing a plurality of pins 1024 into the plurality of pin detents 1030 (FIG. 29), such as pin 1026 being placed into pin detent 1032 (FIG. 28). The description provided herein will be directed to the single pin 1026 and pin detent 1032 (FIG. 18), it should be understood that this description is adequate for describing the plurality of pins 1024 and pin detents 1030. The pin 1026 may be placed in pin detent 1032 (FIG. 29) such that the pin 1026 is captured between the pin detent 1032 and the pin flange 1038 (FIG. 29). The pin 1026 may be further captured by the axle assembly second protrusion second face 240 (FIG. 3) and the axle assembly third surface 250. Such captured placement of the pin 1026 may allow for rotationally sliding contact of the third gear assembly inner bearing surface 1022 (FIG. 28) to the axle assembly third surface 250. This captured placement of the pin 1026 may allow the pin to exert contact force on both the pin detent 1032 (FIG. 28) and the axle assembly third surface 250 (FIG. 3) if the pin 1026 is positioned near the pin detent second end 1036. However, if the pin 1026 is positioned near the pin detent first end 1034 (FIG. 28), the pin does not exert substantial forces on the pin detent 1032 and the axle assembly third surface 250. In one embodiment, the assembly may be provided with a small spring (not shown) that urges the pin 1026 away from the pin detent first end 1034. It should be apparent to those skilled in the art that this overrun clutch 1020 may allow rotational movement between the third gear assembly 1000 and axle assembly 200 when rotating in one direction, however not allowing rotational movement when rotating in the opposite direction.

With continued reference to FIG. 39, the hub motor 100 may be further assembled by providing a starter 1300 between the axle assembly 200 and the starter disk 1250. The starter 1300 may be provided with a pair of pads 1302, such as pad 1304. It is to be understood that pad 1304 may be substantially similar to pad 1152. It is noted that the assemblage of one pad 1304 (also referred to herein as pad 1152) will be provided, it should be understood that the second pad may be assembled in a similar manner. Pad 1152 may be positioned between the starter disk 1250 and the axle assembly 200 such that the pad external surface 1162 may be adjacent to the starter disk inside surface 1256. Furthermore, the pad internal surface 1160 (FIG. 33) may be adjacent to the axle assembly second surface 230 (FIG. 3). This placement may result in the pad first face 1154 (FIG. 33) being adjacent to the axle assembly second protrusion first face 238 (FIG. 3). This placement may also result in the pad second face 1156 being adjacent to the axle assembly first protrusion second face 220 (FIG. 3). Furthermore, the pad 1152 may be hingedly attached to the axle assembly 200 by a starter pin (not shown). The starter pin may be positioned in the first starter mount 310 (FIG. 4) and the pad hole 1158 (FIG. 33). Such hinged attachment may allow for movement of the pad external surface 1162 away from the first axis A1, while inhibiting rotation of the pad 1152 about the first axis A1.

Figure 40:
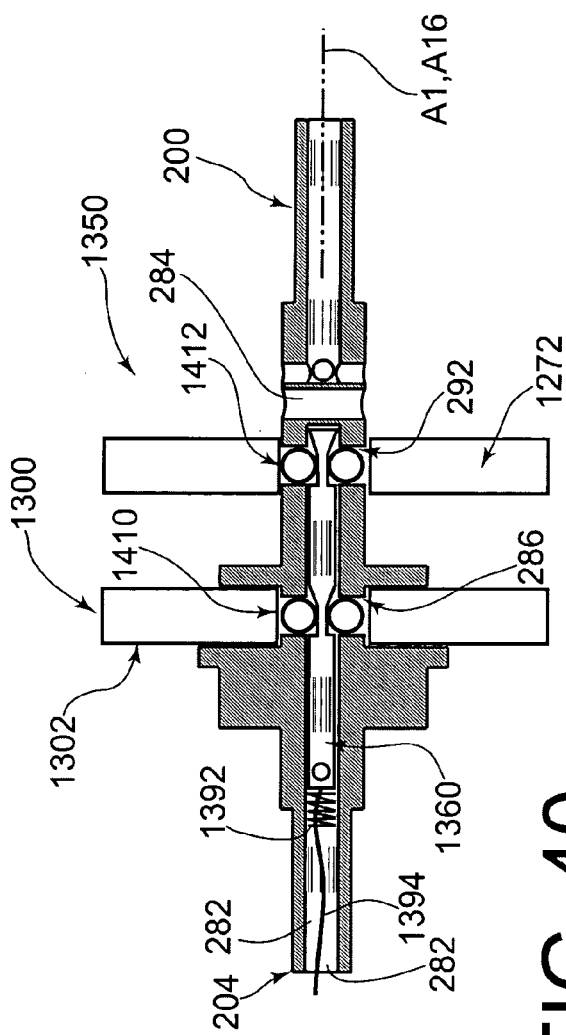
FIG. 40 shows a cross-sectional side view of a starter/overdrive selector assembly assembled contained within the exemplary axle assembly of FIG. 39.
Figure 41:
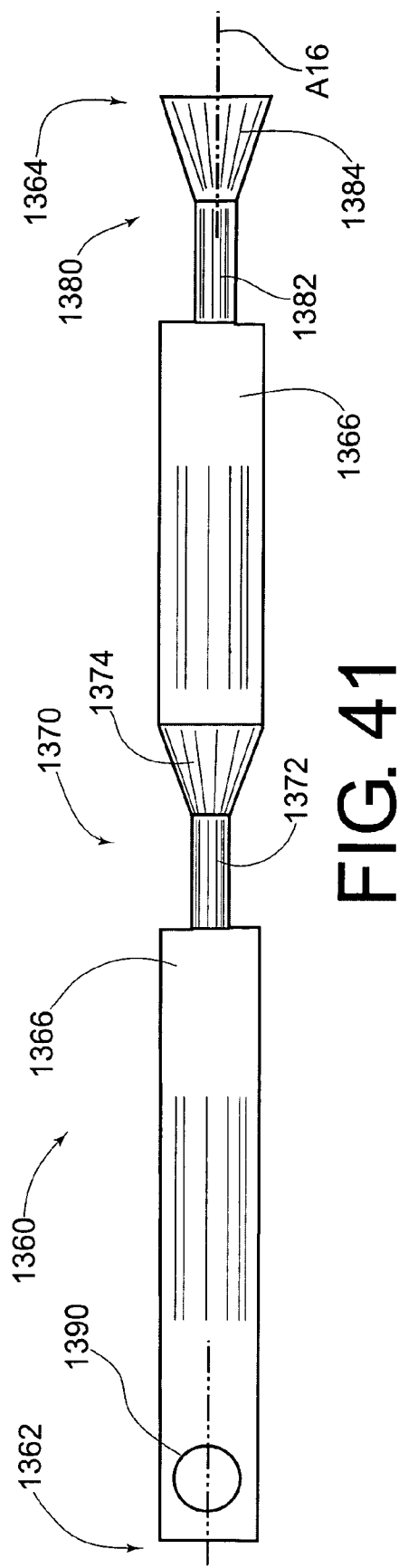
FIG. 41 shows a side elevation view of an exemplary starter/overdrive selector assembly rod.

With reference to FIG. 40, the hub motor 100 may be provided with a starter/overdrive selector assembly 1350. The starter/overdrive selector assembly 1350 may be provided for actuation of the starter pads 1302 and/or the overdrive pads 1272. The starter/overdrive selector assembly 1350 may be provided with a rod 1360. With reference to FIG. 41, the rod 1360 may define a sixteenth axis A16. The rod 1360 may define a first distal end 1362 and an oppositely disposed second distal end 1364. The rod 1360 may take a substantially cylindrical form defined by a surface 1366, the rod surface 1366 may have features formed therein. The rod 1360 may be provided with a first ramp 1370 and a second ramp 1380. The first ramp 1370 may be formed in the rod surface 1366 somewhat near the second distal end 1364. The second ramp 1380 may be formed in the rod surface 1366 between the first ramp 1370 and the second distal end 1362. The first ramp 1370 may be provided with a first surface 1372 and a second surface 1374. The first surface 1372 may take a substantially cylindrical form that may be parallel to the sixteenth axis A16. The second surface 1374 may take the form of a portion of a cone, of which the vertex may be located on the sixteenth axis A16. The small end of the conical second surface 1374 may intersect the first surface 1372. The large end of the conical second surface 1374 may intersect the rod surface 1366.

The second ramp 1380 may be provided with a first surface 1382 and a second surface 1384. The first surface 1382 may take a substantially cylindrical form that may be parallel to the sixteenth axis A16. The second surface 1384 may take the form of a portion of a cone, of which the vertex may be located on the sixteenth axis A16. The small end of the conical second surface 1384 may intersect the first surface 1382. The large end of the conical second surface 1384 may intersect the rod surface 1366. The rod 1360 may be further provided with a connector 1390 formed near the first distal end 1362.

With reference to FIG. 40, the starter/overdrive selector assembly 1350 may be further provided with a cable 1394. The cable 1394 may be attached to the rod connector 1390 and a selector 1400 (FIG. 1). The starter/overdrive selector assembly 1350 may be provided with a pair of starter actuator balls 1410 and a pair of overdrive actuator balls 1412. Additionally, the starter/overdrive selector assembly 1350 may be provided with a return spring 1392 (FIG. 40). The starter/overdrive selector assembly 1350 may be assembled with the axle assembly 200 by placing the rod 1360 into the axle assembly 282 second cavity. The starter actuator balls 1410 may be place in the starter holes 286. The starter actuator balls 1410 may be captured by the starter holes 286, the rod first ramp first surface 1372 (FIG. 41) and the pair of starter pads 1300. The overdrive actuator balls 1412 may be placed in the gearing holes 292. The second pair of actuator balls 1412 may be captured by the gearing holes 292, the rod second ramp first surface 1382 (FIG. 41) and the pair of overdrive pads 1272. The return spring may urge the rod 1360 such that the rod second distal end 1364 (FIG. 41) may be adjacent to the cavity plug 284. When the rod 1360 is urged by the return spring 1392, the starter/overdrive selector assembly 1350 may be placed into a first condition. During this first condition, the first ramp first surface 1372 may be adjacent to the starter holes 286. With the first ramp first surface 1372 adjacent to the starter holes 286, the starter actuator balls 1410 may not be place under compressive forces. Therefore, the starter pads 1300 may not be exerting substantial force on the third gear assembly starter disk 1350 (FIG. 39). During this first condition, the second ramp first surface 1382 may be adjacent to the gearing holes 292. With the second ramp first surface 1382 adjacent to the gearing holes 292, the overdrive actuator balls 1412 may not be place under compressive forces. Therefore, the overdrive pads 1272 may not be exerting substantial force on the overdrive disk 1200.

When the rod 1360 is urged by the cable 1394, the starter/overdrive selector assembly 1350 may be placed into a second condition. During this second condition, the first ramp second surface 1374 (FIG. 41) may be adjacent to the starter holes 286. With the first ramp second surface 1374 adjacent to the starter holes 286, the starter actuator balls 1410 may be place under compressive forces. Therefore, the starter pads 1300 may be exerting force on the third gear assembly starter disk 1250 (FIG. 39). During this second condition, the second ramp second surface 1384 may be adjacent to the gearing holes 292. With the second ramp second surface 1384 adjacent to the gearing holes 292, the overdrive actuator balls 1412 may be place under compressive forces. Therefore, the overdrive pads 1272 may be exerting substantial force on the overdrive disk 1200 (FIG. 39). It should be noted that in one exemplary embodiment, when the hub motor 100 is in the second condition, the third gear assembly 1000 may be fixedly (i.e. non-rotatably) attached to the axle assembly 200. Additionally, in this exemplary second condition, the overdrive disk 1200 may be fixedly (i.e. non-rotatably) attached to the axle assembly 200.

With reference to FIG. 38, the hub motor 100 may be provided with a carburetor 1500. The carburetor 1500 may be any one of a variety of carburetors such as, for example, a diaphragm carburetor, a needle-jet carburetor, or other metering device known to those skilled in the art. As shown in FIG. 38, a needle-jet carburetor 1500 may be provided with a connection 1502 (e.g. threads) for fixedly attaching the carburetor 1500 to the axle assembly 200 (it is noted that the axle assembly 200 is fixedly attached to the bicycle 10, therefore the carburetor 1500 is fixedly attached to the bicycle 10). The carburetor 1500 may be further provided with an air passage 1510. The air passage 1510 may originate at an intake 1512. The air passage intake 1512 may be attached to an air filter 1514. The filter 1514 may be provided with an outlet to which an internal passage 1516 may be attached. The internal passage 1516 may be attached to a mixing zone 1518. The mixing zone 1518 may be attached to a check valve 1530, such as a reed valve. The check valve 1530 may be attached to the threaded connection 1502.

With continued reference to FIG. 38, the carburetor 1500 may be further provided with a fluid passage 1540. The fluid passage 1540 originates at an intake 1542. The fluid passage intake 1542 may be attached to a jet 1544. The jet 1544 may be configured in the mixing zone 1518. It is noted that the connections between components of the carburetor 1500 may be referred to herein as being in 'fluid communication' with each other. As used herein, the term fluid communication means that air and/or fluid may be transported between two areas (e.g. the engine may be in fluid communication with the carburetor). The carburetor may be further provided with a throttle plate 1550. The throttle plate 1550 may be configured such that flow of air through the air passage 1510 may be selectively controlled. This selective control of the air passage 1510 may be controlled via a throttle cable 1560 to which the throttle plate 1550 is attached. The throttle cable 1560 may be attached to a throttle grip 1564 (FIG. 1).

With reference to FIG. 1, the hub motor 100 may be further provided with a fuel tank 1600 the fuel tank 1600 may be attached to the fluid passage intake 1542 (FIG. 38) via a fuel line 1602.

With reference to FIG. 38, having provided a description of exemplary components of the carburetor 1500, a description of the transfer of fuel from the fuel tank 1600 to the engine 500 will now be provided. Fuel, such as, for example, gasoline, hydrogen, ethanol, propane, etc. may be stored in the fuel tank 1600. The fuel may travel from the fuel tank 1600 through the fuel line 1602 to the fluid passage intake 1542. After entering the fluid passage intake 1542, the fuel may travel to the jet 1544. At the jet 1544, the fuel may be mixed with air that is traveling through the air passage 1510 in the mixing zone 1518. It is noted that the air may be purified by the filter 1514 to remove any contaminates therefrom. This mixture of the air and the fuel in the mixing zone 1518 results in an combustible air/fuel mixture. This air/fuel mixture may also be referred to herein as a combustible mixture, a combustible gas, or other equivalents describing a mixture which is combustible.

In a process to be described later herein, the combustible mixture may travel from the mixture zone 1518 past the check valve 1530, and through the threaded connection 1502 and into the axle assembly 200. The combustible mixture may travel from the axle assembly first distal end 202, through the first cavity 280 and to the fuel holes 300. Once the combustible mixture travels to the fuel holes 300, the mixture may enter an interior portion 102 of the hub motor 100.

With reference to FIG. 36, the hub motor interior portion 102 may be defined as the area of the hub motor 100 substantially encased by the covers 350 and the hub 400. It should be noted that this interior portion 102 may be substantially air-tight wherein a pressure may be applied thereto and retained for a duration of time. Additionally, this interior portion may be configured such that it substantially retains a vacuum as well as a pressure. A pair of o-rings (not shown) may be positioned in the hub first flange groove 450 and the hub second flange groove 590. This interior portion 102 may receive the combustible mixture from the carburetor 1500 via the fuel holes 300. This combustible mixture may disperse throughout the entire interior portion, thereby being 'available' at the combustion chamber intake port 532 (FIG. 12). It is noted that as used herein, the term 'available' when referenced to the combustible mixture may mean that the combustible mixture is accessible in a substantial quantity to allow for proper operation of the engine 500.

The hub motor 100 may be provided with an ignition system 1650. Although ignition systems are known to those skilled in the art, one particular embodiment will now be described. It is noted that this exemplary embodiment is provided for illustrative purposes only and may be modified or replaced depending on performance objectives. The ignition system 1650 may be a Hall Effect type wherein a controller monitors the performance of the engine 500 and adjusts the spark of the sparkplug 510 accordingly. The ignition system 1650 receives input that the piston 600 is located at the uppermost portion of the engine (i.e. the combustible media is fully compressed). This input may be provided by a mechanical point or a Hall Effect device sensing presence of a magnet located in the input assembly second crank blind hole 750 (FIG. 20). The ignition system 1650 sends electricity to the sparkplug 510 that ignites the combustible media contained within the engine combustion chamber 530. As part of this ignition system 1650, electricity may be provided by a battery pack, alternator or magneto.

With reference to FIG. 2, the wheel 14 may be assembled by providing the hub motor 100 with a rim 130, a tire 132, a tube 134 and a plurality of spokes 136, such as spokes 138, 140. The plurality of spokes 136 may be utilized to attach the rim 130 to the hub 400. Such attachment of the rim 130 to the hub 400 may be accomplished by lacing the spokes 136 through the hub spoke holes 410, 420. It should be noted that if the engine 500 obstructs the spokes 136, the engine 500 may have spoke clearance grooves formed therein. The wheel 14 may be rotationally attached to the bicycle 10 by fixedly attaching the axle assembly 200 to the forks 18. This fixed attachment of the axle assembly 200 to the forks 18 may utilize threaded nuts (not shown). A first nut may attach the axle assembly first distal end 202 to the first fork distal end mounting plate 54. A second nut may attach the axle assembly second distal end 204 to the second fork distal end mounting plate 64.

Exemplary operation of the hub motor 100 will now be described. The operation may result in a number of conditions such as an off condition, a starting condition, an idling condition and an operating condition. The operating condition may be provided with at least a first condition and a second condition.

The off condition of the hub motor 100 will now be described. During the off condition, the hub motor 100 doe not consume any fuel. In this condition, the third gear assembly overrun clutch 1020 and the first gear assembly overrun clutch 820 may allow for the hub motor 100 to 'overrun' the axle assembly 200. As used herein the term 'overrun' may be defined as a condition wherein a first element is allowed to rotate freely around a second element. In the case of the third gear assembly overrun clutch 1020, the third gear assembly 1000 may rotate freely about the axle assembly 200 (i.e. the third gear assembly 1000 overruns the axle assembly 200). In the case of the first gear assembly overrun clutch 820, the first gear assembly 800 may rotate freely about the axle assembly 200. In this off condition, the bicycle 10 may be used as a conventional transportation device by pedaling the cranks 40 and the hub motor 100 does not impart any forces on the forward movement.

The starting condition of the hub motor 100 will now be described. The process of starting the engine 500 may occur during when a user desires to bring the hub motor 100 to the idling and/or operating condition from the off condition. Assuming that the bicycle 10 is in motion in the first direction D1 (FIG. 1), during the starting condition, the starter/overdrive selector assembly 1350 may be activated (previously described herein as the starter/overdrive selector assembly second condition). Activation of the starter/overdrive selector assembly 1350 may result in the rod 1360 displacing the pair of starter actuator balls 1410 away from the first axis A1. This displacement of the starter actuator balls 1410 may result in the starter pads 1302 inhibiting rotational movement of the third gear assembly 1000 about the axle assembly 200. This lack of rotational movement between the third gear assembly 1000 and the axle assembly 200 may also be refereed to herein as fixedly attaching the third gear assembly 1000 to the axle assembly 200. This attachment may result in rotational movement of the hub motor 100 causing movement of the piston 600. Such piston movement may result in the piston 600 reciprocating in the engine 500 along the fifth axis A5. By reciprocating in the engine 500, the piston compresses any combustible mixture located in the engine 500. With compression of the combustible mixture, the engine 500 may be started by providing a spark (unless the engine 500 is configured in a diesel format). The ignition system 1650 may provide this spark via the sparkplug 510. Once the engine receives this spark, the engine may be placed into the idling condition.

The idling condition of the hub motor 100 will now be described. During the idling condition, the hub motor 100 may be consuming fuel and therefore considered to be running. In this idling condition, the third gear assembly overrun clutch 1020 and the first gear assembly overrun clutch 820 may allow for the hub motor 100 to 'overrun' the axle assembly 200 (assuming that the starter/overdrive selector assembly is returned to the first condition; this condition may be referred to herein as an underpowered condition). Utilizing the third gear assembly overrun clutch 1020, the third gear assembly 1000 may rotate freely about the axle assembly 200. Utilizing the first gear assembly overrun clutch 820, the first gear assembly 800 may rotate freely about the axle assembly 200. This idling condition allows the engine 500 to be running, but not actually accelerating the bicycle 10.

The operating condition of the hub motor 100 will now be described. During the operating condition, the engine 500 accelerates the bicycle 10 by taking in clean combustible mixture, compressing the combustible mixture, igniting the combustible mixture (thereby creating a spent mixture) and exhausting the spent mixture. The process of igniting combustible mixtures is well known in the art of internal combustion engines, however a brief description will now be provided. With reference to FIG. 36, at the outset, the combustible mixture located in the hub interior portion 102 may be drawn into the combustion chamber 530 through the intake port 532 (FIG. 12). The piston 600 may move in a second direction D2 thereby compressing the combustible mixture in the combustion chamber 530. At the top of the stroke of the piston 600, the ignition system 1650 may send a signal to the sparkplug 510. The sparkplug 510 may ignite the compressed combustible mixture thereby moving the piston 600 in a third direction D3. This piston movement in the third direction D3 may impart a force on the input assembly 700. Once the piston 600 passes the exhaust 534, the spent gas may be expelled from the combustion chamber 530 to the muffler 536. As the spent gas is expelled, the combustible mixture is drawn into the combustion chamber 530 through the intake port 532 (FIG. 12). The process continues as required, thereby providing rotation of the input assembly 700. Force applied to the input assembly 700 may be harnessed to cause rotation of the input assembly 700. This rotation of the input assembly 700 may be transmitted through the hub motor 100 to cause rotation of the hub motor 100. Rotation of the hub motor 100 is mirrored by the rim 130 and tire 132. Rotation of the tire 132 urges the bicycle 10 in the first direction D1.

During the first operating condition, the hub motor 100 may be configured such that the bicycle 10 may operate at relatively lower speeds. This relatively lower speed may require that the relatively high revolutions per minute (RPM) of the engine 500 be converted to the relatively low revolutions per minute of the wheel 14. In order to reduce the high RPMs of the engine 500 to the low RPMs of the wheel 14, the third gear assembly 100 may be drivingly engaged with the axle assembly. Therefore, in the first operating condition, the energy applied to the input assembly 700 by the piston 600 may travel through the first gear assembly 800 to the second gear assembly 900. The energy may be further transferred from the second gear assembly 900 to the third gear assembly 1000. In one exemplary embodiment, such transmission of energy may result in a reduction of the engine RPMs from 5000 RPM to 50 RPM through a 100:1 reduction. This reduction may be accomplished through the combination of the first, second and third gear assemblies 800, 900, 1000.

During the second operating condition, the hub motor 100 may be configured such that the bicycle 100 may operate at relatively high speeds. This relatively high speed may require that the relatively high revelations per minute (RPM) of the engine 500 be converted to the relatively higher revolutions per minute (when compared to the first operating condition) of the wheel 14. In order to minimize the reduction of the high RPMs of the engine 500 to the higher RPMs of the wheel 14, the first gear assembly 800 may be drivingly engaged with the axle assembly 200. Therefore, in the second operating condition, the energy applied to the input assembly 700 may travel to the first gear assembly 800. In one exemplary embodiment, such transmission of energy may result in a reduction of the engine RPMs from 2000 RPM to 333 RPM through a 6:1 reduction.

In both the first and second driving conditions, the first gear assembly overrun clutch 820 and the third gear assembly overrun clutch 1020 may serve to control the power input of the engine 500. When employed, the overrun clutches 820, 1020 allow the engine 500 to accelerate the bicycle 10 in the first direction D1, while substantially prohibiting deceleration in the first direction D1. As such, the user my pedal the bicycle 10 with the cranks 40 to either assist or solely-power the bicycle 10.

For descriptive purposes only, an exemplary scenario will be provided. With reference to FIG. 1, a user (not shown) may be located on the bicycle 10. At the outset, the hub motor 100 is in the off condition. The user begins to ride the bicycle 10 in the first direction D1 by pedaling the cranks 40. Pedaling of the cranks 40 causes movement of the chain 42. Movement of the chain 42 causes counterclockwise CCW rotation of the rear wheel 16. The rotation of the rear wheel 16 may cause movement in the first direction D1. Movement of the rear wheel 16 is mirrored by the frame 12 and the front wheel 14. This movement of the front wheel 14 also causes counterclockwise CCW rotation of the front wheel 14.

Rotation of the front wheel 14 may allow for the user to invoke the starting condition of the hub motor 100. The user may desire to invoke the starting condition in order to urge the hub motor 100 into the operating condition so that the bicycle 10 may be propelled by the hub motor 100. During this stating condition, the user may select the starter/overdrive selector assembly selector 1400 to place the starter/overdrive selector assembly 1350 into the second condition. Such activation of the selector 1400 may urge the cable 1394, thereby causing movement of the rod 1360. As previously described movement of the rod 1360 displaces the starter pads 1302, the third gear assembly 1000 may become temporarily fixedly attached to the axle assembly 200. By temporarily fixedly attaching the third gear assembly 1000 to the axle assembly 200, the gear assemblies 800, 900, 1000 may begin to rotate with respect to the hub 400 and the engine 500 attached thereto. The movement of the gear assemblies may cause the piston 600 to reciprocate in the engine 500 in a manner previously described. This reciprocation of the piston 600 acts as a 'fuel pump' that draws combustible media from the carburetor 1500 (it should be noted that access to fuel is controlled by the users input to the throttle grip 1564). In a process previously described, the combustible media is introduced into the combustion chamber 1530 and ignited by the ignition system 1650. As the piston 600 reciprocates, the ignition of combustible media adds energy to the hub motor 100.

The energy added to the hub motor 100 via the piston 600 is transferred to the input assembly 700 in a manner previously described. This energy may be transferred to the axle assembly 200 such that the bicycle 10 accelerates in the first direction D1. Once the user desires to maintain a speed in the first direction D1, input of energy by the engine 500 may be reduced. This reduction of input by the engine 500 may be invoked through the users selection of the throttle grip 1564. With a reduction of the combustible media input through the throttle grip 1564, the engine 100 may be placed into the idling condition. During this idling condition, the engine 500 may still be running, however it is not contributing to movement in the first direction D1. This idling condition may continue until the user desires to accelerate in the first direction D1, upon occurrence, for example, of a straight section of road. To accelerate, the user may activate the throttle grip 1564 to open the throttle plate 1550. An increase in air flowing through the air passage 1510 may also increase the flow of fuel from the jet 1544. Increased flow of air and fuel, may result in an increase in combustible media being available for the engine 500. This increased availability of combustible media may allow the engine 500 to contribute more energy to the hub motor 100. As this increased energy is imparted on the hub motor 100, the third gear overrun clutch 820 may be urged into the condition wherein the axle assembly 200 is substantially fixedly attached to the third gear assembly 1000. With this fixed attachment, the bicycle 10 may begin to accelerate in the first direction D1. This process may continue indefinitely (so long as fuel reserves exist) until the user desires to place the hub motor into the off condition. Such activation may occur by shutting off the supply of fuel and/or shutting of the ignition system 1650.

If during the previously described operating condition the user desires to travel at a higher velocity in the first direction D1, the user may invoke the second driving condition. By activating the starter/overdrive selector assembly selector 1400, the user may cause the overdrive pads 1272 to fixedly attach the overdrive disk 1200 to the axle assembly 200. By fixedly attaching the overdrive disk 1200 to the axle assembly 200, the gearing ratio of the hub motor 100 may be decreased. By decreasing the hub motor gearing ratio, the bicycle 10 may be powered in the first direction D1 at an increased speed because the engine 500 does not have to run at high RPMs. This activation of the selector 1400 may result in the revolutions of the engine 500 to be reduced by one of two factors.

Figure 44:
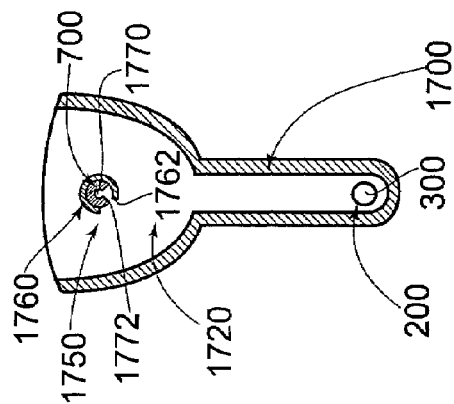
FIG. 44 shows a cross-sectional view of a rotary valve.
Figure 43:
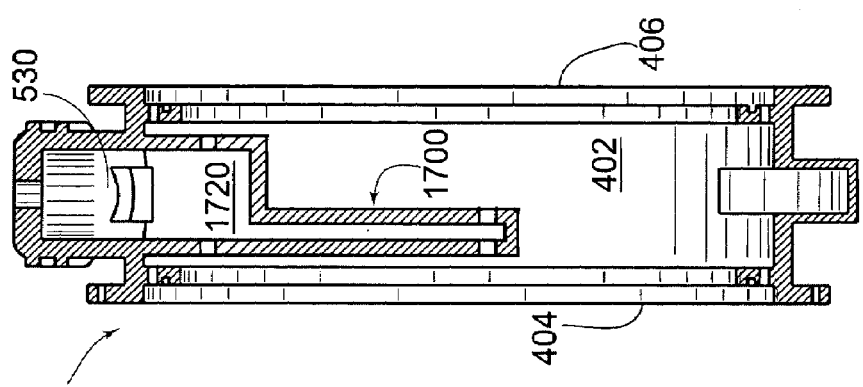
FIG. 43 shows a cross-sectional view of the hub motor provided with the fuel rail of FIG. 42.
Figure 42:
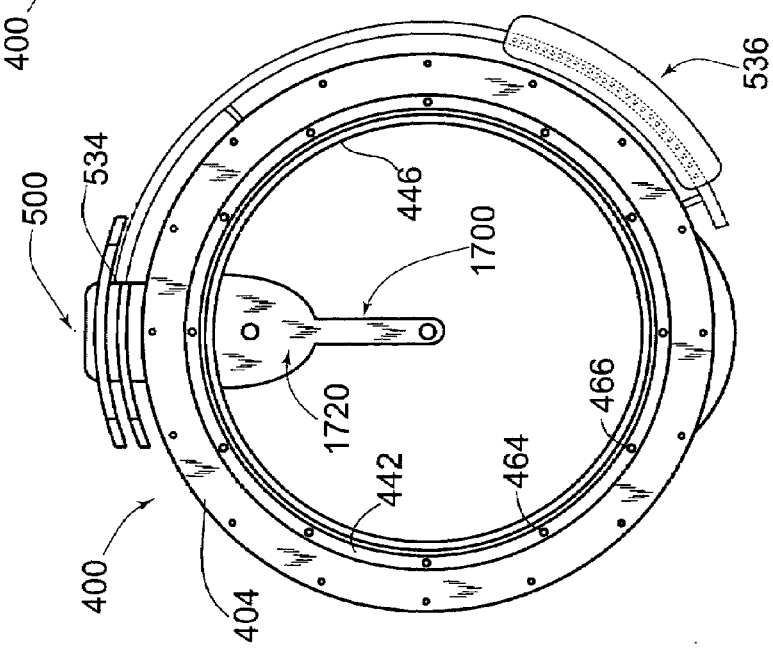
FIG. 42 shows a side elevation view of a hub motor provided with fuel rail and a confined portion.

As shown in FIGS. 42 and 43, in one alternative embodiment, the hub motor 100 may be provided with a fuel rail 1700. The fuel rail 1700 may be configured such that a receiving end 1702 captures fuel and/or combustible mixture from the fuel holes 300 located in the axle assembly 200. The captured fuel and/or combustible mixture may be transported from the fuel holes 300 to the intake port 532 through the fuel rail 1700. The fuel rail 1700 may transport this fuel as a liquid or as a combustible mixture; such alternatives depend on the placement of a carburetor. If the carburetor is placed near the engine 500, the fuel rail 1700 will transport liquid. However, if the carburetor is fixedly located on the bicycle 10 (as shown in FIG. 38), then the fuel rail 1700 will transport a combustible mixture. If the fuel rail 1700 transports a combustible mixture, the input assembly 700 may require a confined portion 1720 from which the combustible mixture may be drawn. In the event that a confined portion 1720 is implemented, the hub internal portion 102 may have a lubricant located therein (this lubricant would not be mixed with the combustible mixture). If employed, the fuel rail 1700 allows throttle response to be relatively quick because the volume (contained in the confined portion 1720) which is being pressurized by the piston 600 is substantially less then the volume referred to as the hub interior portion 102. When the confined portion 1720 is employed, bearings to support the input assembly 700 may be supported by the confined portion 1720. Additionally, the fuel rail 1700 and confined portion 1720 may allow the check valve 1530 to be located such that the confined portion 1720 is separated from the fuel rain 1700. This check valve may be configured as a rotary valve as illustrated in FIG. 44. FIG. 44 illustrates one type of rotary valve 1750. The rotary valve 1750 may be provided with a stationary body 1760 that has an intake port 1762 formed therein. The rotary valve 1750 may also be provided with features formed in the input assembly 700 such as an intake passage 1770 and an intake port 1772. The rotary valve 1750 may be configured to allow the confined portion 1720 to be pressurized by blocking flow of combustible media from the confined portion 1720 towards the fuel holes 300. Additionally the rotary valve 1750 may allow the engine 500 to run at higher speeds because the pressurization of the confined portion 1720 may continue even thought the speeds are relatively high.

In one alternative embodiment, the fuel may be provided with a quantity of lubricant. This lubricant may be dispersed within the hub interior 102 thereby lubricating the moving components (e.g. the gear assemblies 800, 900, 1000).

In one alternative embodiment, the overrun clutches 820, 1020 may take the form of a ratchet and a pawl. This ratchet and pawl configuration of the overrun clutches 820, 1020 may operate in a similar manner as the pin detent configuration.

In one alternative embodiment, the starter/overdrive selector assembly 1350 may be configured to allow for independent selection of the starter pads 1302 and the overdrive pads 1272. This embodiment may, for example, employ a rod substantially similar to rod 1360 with the exception being that the first and second ramps 1370, 1380 may be configured with opposing orientation.

In one alternative embodiment, the engine 500 may take the form of an electric motor. This electric motor may be configured such that the gear assemblies and/or overdrive assemblies may be implemented therewith.

In one alternative embodiment, the hub motor 100 may be provided with a centrifugal clutch formed between the two of the gears. One such location for the centrifugal clutch is location between the third gear 860 and the second gear 810. With reference to FIG. 21, the centrifugal clutch may be configured such that the second gear 810 may rotate while the third gear 860 remains relatively stationary. The centrifugal clutch may engage the third gear 860 when the speed of rotation of the engine 500 is above its minimum idling speed (e.g. 1750 revolutions per minute). Although many types of centrifugal clutch may allow this type of engagement, a spring-loaded centrifugal clutch often acts upon a steel bell. When the second gear 810 rotates fast enough, the force of the spring is overcome, thereby engaging the third gear 860 with the second gear 810.

Another alternative embodiment may incorporate other types of starter mechanisms such as flat-disk friction pads that act in a concentric ma herein. In this alternative embodiment, the starter mechanism may operate similar to the operation of a disk brake on an automobile (rather than as a drum-brake).

In another alternative embodiment illustrated in FIG. 42, the muffler 536 may be formed in a semi-circular manner to match the profile of th via the exhaust port 534. Mounting posts (not shown) may be provided to attach the muffler 536 to the hub 400 at a variety of positions.

While illustrative embodiments have been described in detail herein, it is to be understood that the inventive concepts may be otherwise variously embodied and employed and that the appended claims are intended to be construed to include such variations except insofar as limited by the prior art.

I claim:

1. A transportation device comprising:
   a frame;
   a rear wheel rotationally supported by said frame;
   a crank operably associated with said rear wheel;
   a front wheel rotationally and pivotally supported by said frame;
   an axle to which said front wheel is rotationally mounted;
   an engine formed in said front wheel; and
   wherein said engine and said front wheel rotate together about said axle.

2. The transportation device of claim 1 and further comprising:
   a carburetor in fluid communication with said engine; and
   wherein said carburetor comprises a diaphragm pump.

3. The transportation device of claim 1 wherein said engine is selectably engagable to said axle.

4. The transportation device of claim 1 and further comprising:
   a hub comprising an external cylindrical face; and
   a muffler wrapped radially around a portion of said hub external cylindrical face and attached to said engine.

* * * * *